(12) United States Patent
Keating et al.

(10) Patent No.: US 10,419,953 B2
(45) Date of Patent: Sep. 17, 2019

(54) SELF-HEALING LIGHTING NETWORK

(71) Applicant: Echelon Corporation, Santa Clara, CA (US)

(72) Inventors: Mark Keating, Clearwater, FL (US); Jwalant Dholakia, Safety Harbor, FL (US); Jonathan Lloyd, Sacramento, CA (US); Glen Riley, Saratoga, CA (US); John Waclawsky, Alpine, WY (US)

(73) Assignee: Echelon Corporation, Santa Clara, CA (US)

( * ) Notice: Subject to any disclaimer, the term of this patent is extended or adjusted under 35 U.S.C. 154(b) by 0 days.

(21) Appl. No.: 15/831,431

(22) Filed: Dec. 5, 2017

(65) Prior Publication Data
US 2019/0174329 A1    Jun. 6, 2019

(51) Int. Cl.
*H05B 37/02*    (2006.01)
*H04L 29/08*    (2006.01)
*H04W 24/02*    (2009.01)
*H04W 48/16*    (2009.01)
H05B 33/08    (2006.01)
H04W 88/04    (2009.01)
H04W 88/16    (2009.01)
H04W 84/18    (2009.01)

(52) U.S. Cl.
CPC ......... *H04W 24/02* (2013.01); *H04W 48/16* (2013.01); *H05B 37/0272* (2013.01); *H04W 84/18* (2013.01); *H04W 88/04* (2013.01); *H04W 88/16* (2013.01); *H05B 33/0842* (2013.01); *H05B 33/0845* (2013.01)

(58) Field of Classification Search
CPC .............. H04N 5/2351; H05B 33/0845; H05B 33/0854; H05B 37/0272; H04W 24/02; H04W 84/18; H04W 88/04
USPC ....... 455/7, 13.1, 9, 41.2, 500, 67.11, 552.1, 455/572, 115.1, 135, 436; 370/250, 315, 370/328, 330, 338, 431; 315/151, 291, 315/152, 193; 340/870.03; 709/220
See application file for complete search history.

(56) References Cited

U.S. PATENT DOCUMENTS 9,655,214 B1 *  5/2017  Sooch .................... G08C 17/02
9,655,215 B1 *  5/2017  Ho ...................... H05B 37/0272
(Continued)

FOREIGN PATENT DOCUMENTS

WO    WO 2016048428    3/2016

*Primary Examiner* — Tan H Trinh
(74) *Attorney, Agent, or Firm* — Locke Lord LLP

(57) ABSTRACT

A central management system polls a lighting node in a mesh lighting network, sending a command message for the node to measure a link quality indication (LQI) of the received command message. The node returns a status message, including in its payload the measured LQI. The management system computes from the node's status messages, a statistical characterization of the link quality of the node and compares it with a threshold quality value. If the comparison indicates sufficient degradation in link quality, the management system automatically transmits a disconnect command to the node. In response, the node disconnects and enters a discovery mode to find a better quality link to rejoin the network. In example embodiments, the lighting node may also report its illumination and operational status in the payload of the status message, along with the LQI, enabling the management system to determine whether illumination by the node is failing.

18 Claims, 17 Drawing Sheets

(56) References Cited

U.S. PATENT DOCUMENTS

| | | | |
|---|---|---|---|
| 9,854,653 B1* | 12/2017 | Ackmann | H05B 37/0272 |
| 10,182,357 B1* | 1/2019 | Keating | H04W 24/02 |
| 2003/0151285 A1* | 8/2003 | Keegan | A47D 1/004 |
| | | | 297/256.13 |
| 2003/0161285 A1* | 8/2003 | Tiedemann, Jr. | H04B 17/24 |
| | | | 370/332 |
| 2005/0116667 A1* | 6/2005 | Mueller | E04F 13/08 |
| | | | 315/312 |
| 2008/0049779 A1* | 2/2008 | Hopmann | H04L 12/2807 |
| | | | 370/431 |
| 2009/0284169 A1* | 11/2009 | Valois | H05B 37/0254 |
| | | | 315/291 |
| 2010/0008261 A1* | 1/2010 | Javaid | H04W 40/22 |
| | | | 370/254 |
| 2010/0028003 A1* | 2/2010 | Nakamura | H04B 10/07955 |
| | | | 398/79 |
| 2010/0142434 A1* | 6/2010 | Rodmell | H04W 88/02 |
| | | | 370/315 |
| 2010/0142447 A1* | 6/2010 | Schlicht | H04W 4/20 |
| | | | 370/328 |
| 2011/0115386 A1* | 5/2011 | Delnoij | G01J 1/16 |
| | | | 315/152 |
| 2011/0299422 A1* | 12/2011 | Kim | H04W 48/16 |
| | | | 370/253 |
| 2012/0098445 A1* | 4/2012 | Park | H05B 37/0272 |
| | | | 315/193 |
| 2012/0098446 A1* | 4/2012 | Kim | H05B 37/0272 |
| | | | 315/193 |
| 2012/0299509 A1* | 11/2012 | Lee | H04L 41/0806 |
| | | | 315/291 |
| 2013/0116003 A1* | 5/2013 | Chhatbar | G08C 17/02 |
| | | | 455/524 |
| 2013/0181609 A1* | 7/2013 | Agrawal | H05B 37/03 |
| | | | 315/131 |
| 2013/0214687 A1* | 8/2013 | Weaver | H05B 37/0272 |
| | | | 315/151 |
| 2013/0234862 A1* | 9/2013 | Toth | H04Q 9/00 |
| | | | 340/870.03 |
| 2013/0268654 A1 | 10/2013 | Abraham et al. | |
| 2014/0233401 A1* | 8/2014 | Jiang | H04W 64/00 |
| | | | 370/250 |
| 2015/0071275 A1* | 3/2015 | Yuk | H04W 48/16 |
| | | | 370/338 |
| 2015/0200714 A1* | 7/2015 | Hui | H04B 3/544 |
| | | | 375/257 |
| 2015/0213415 A1* | 7/2015 | Yang | G05B 19/4083 |
| | | | 705/7.17 |
| 2016/0094399 A1 | 3/2016 | Kish | |
| 2016/0198548 A1* | 7/2016 | Monaci | H05B 37/0218 |
| | | | 315/152 |
| 2017/0006117 A1* | 1/2017 | Kafle | H04L 65/4084 |
| 2017/0013697 A1* | 1/2017 | Engelen | H05B 37/0272 |
| 2017/0048936 A1* | 2/2017 | Trouwborst | H05B 33/0893 |
| 2017/0124856 A1* | 5/2017 | Benien | H05B 37/0272 |
| 2017/0163331 A1* | 6/2017 | Breiling | H04B 7/15592 |
| 2017/0230926 A1* | 8/2017 | Seo | H04W 56/0015 |
| 2017/0230928 A1* | 8/2017 | Basu Mallick | H04W 56/0045 |
| 2017/0251541 A1* | 8/2017 | Cavalcanti | H05B 37/0272 |
| 2017/0277147 A1* | 9/2017 | De Vaan | H05B 37/0272 |
| 2017/0347433 A1* | 11/2017 | Sierla | H05B 37/0245 |
| 2018/0026836 A1* | 1/2018 | Turvy, Jr. | H04W 76/10 |
| | | | 709/220 |
| 2018/0242228 A1* | 8/2018 | Jung | H04W 48/14 |
| 2019/0008017 A1* | 1/2019 | Modi | H05B 37/0227 |

* cited by examiner

FIRST AVE.
LIGHTING NODES

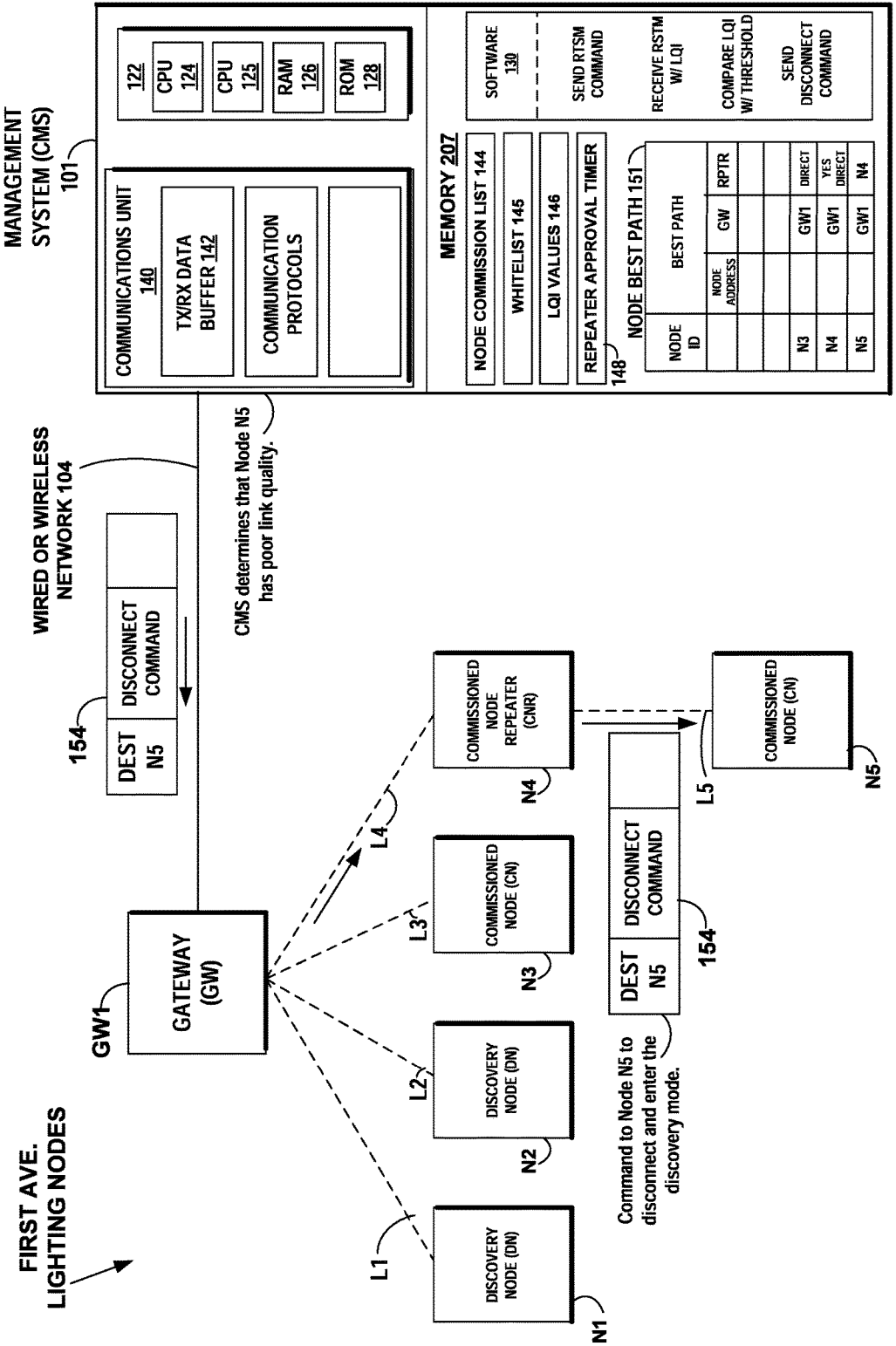

FIRST AVE.
LIGHTING NODES

FIRST AVE. LIGHTING NODES

FIRST AVE.
LIGHTING NODES

FIRST AVE.
LIGHTING NODES

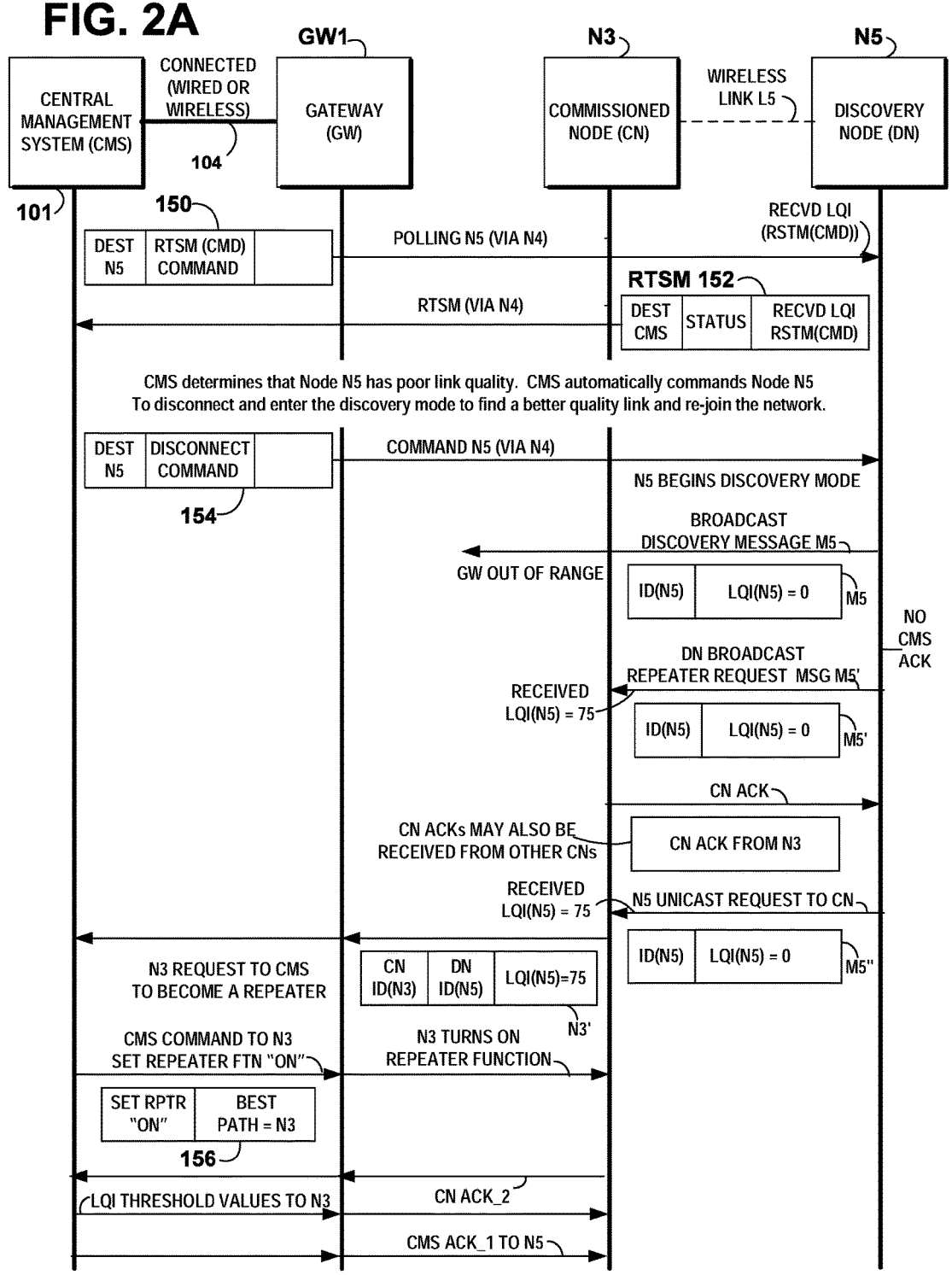

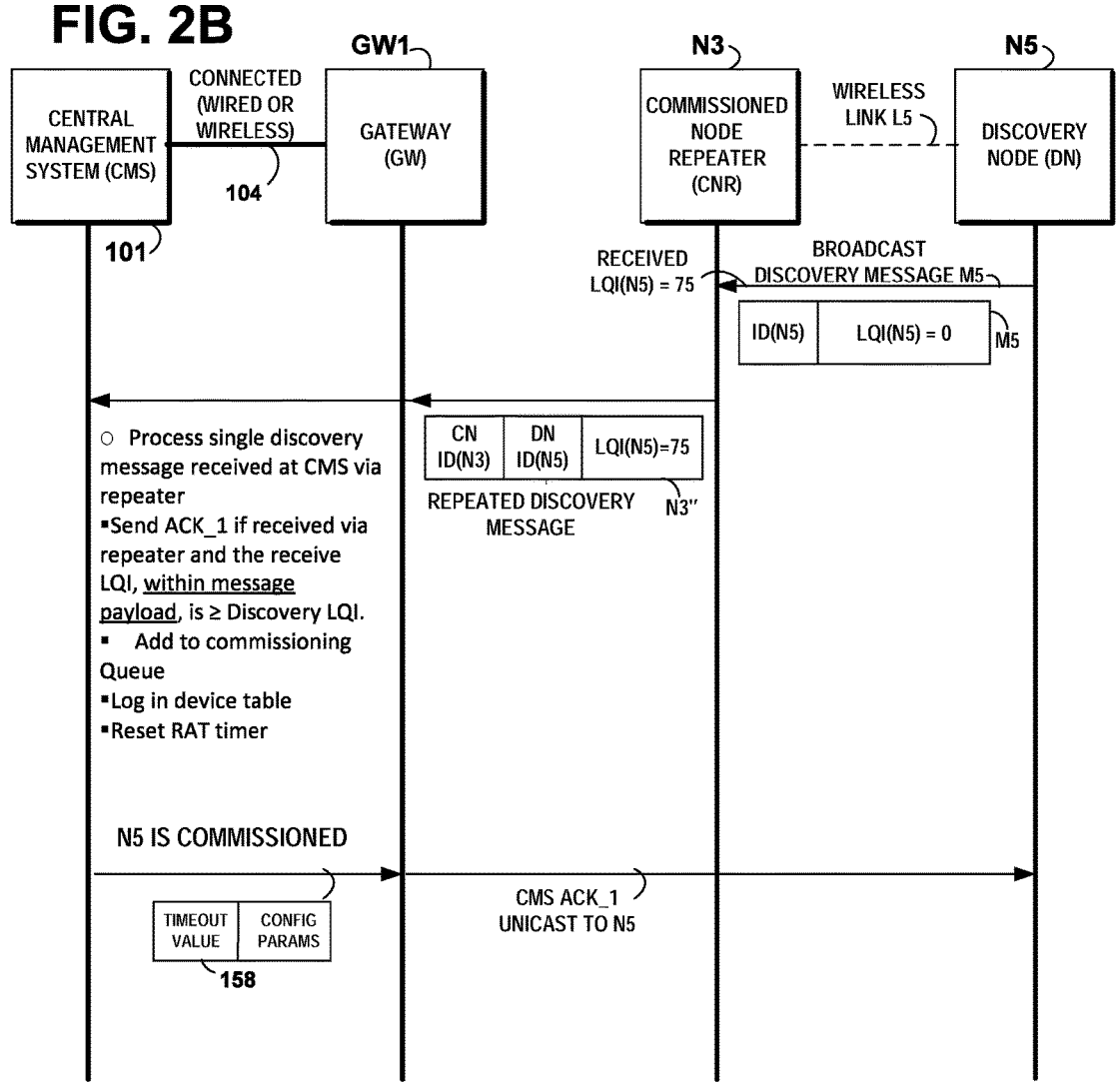

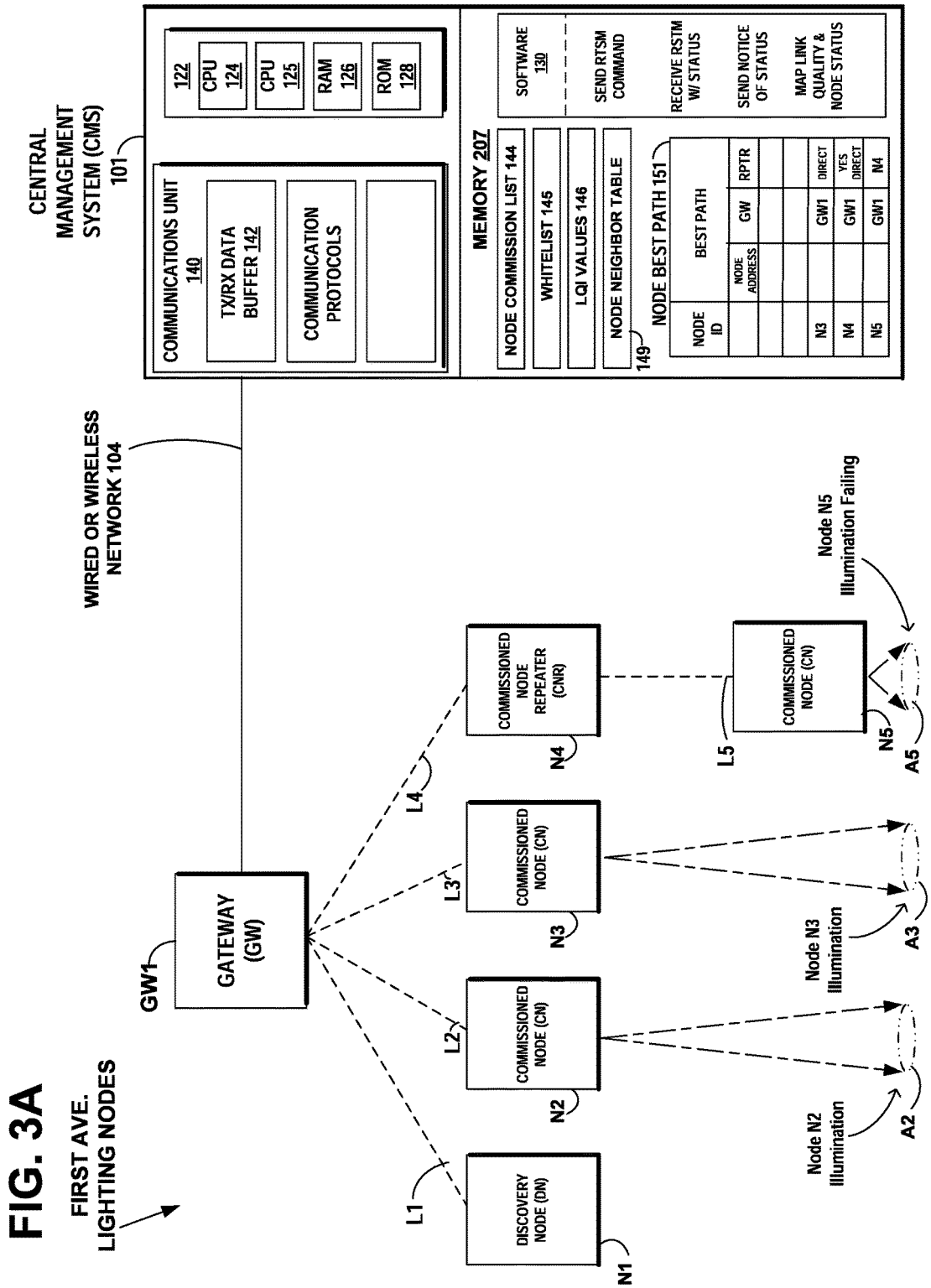

FIRST AVE. LIGHTING NODES

FIRST AVE. LIGHTING NODES

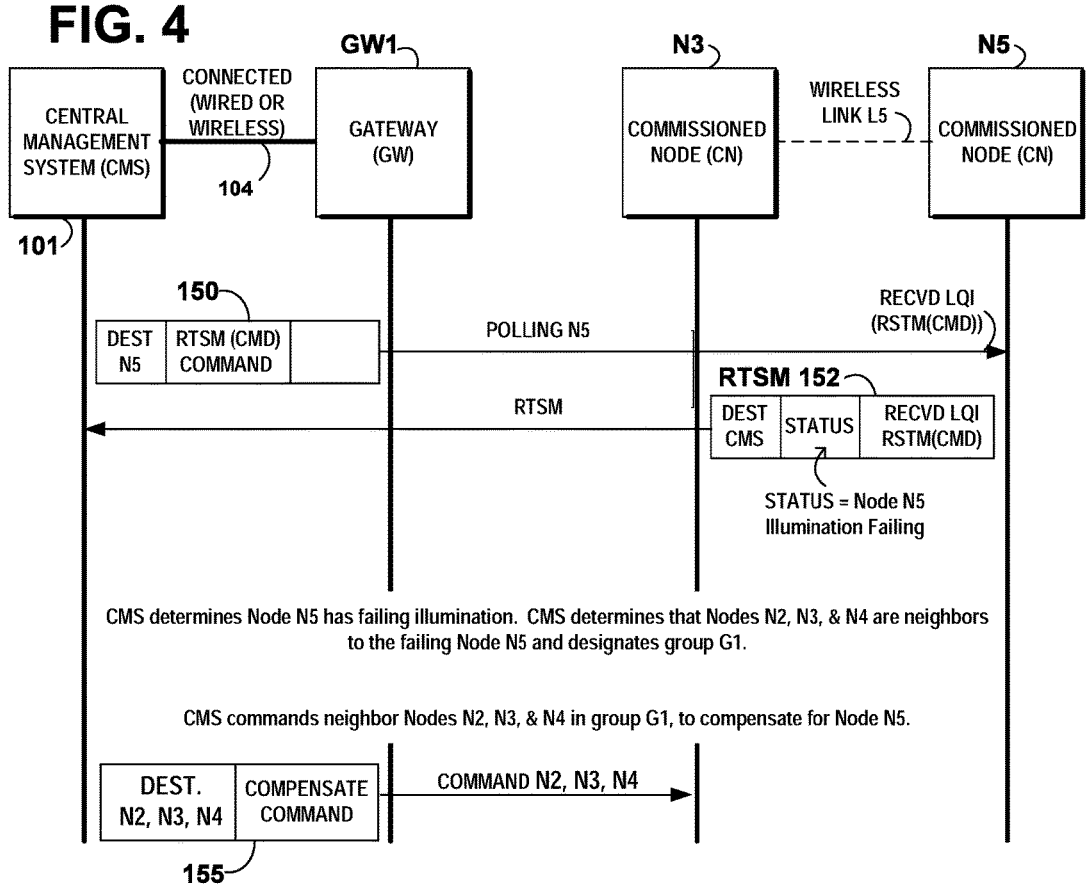

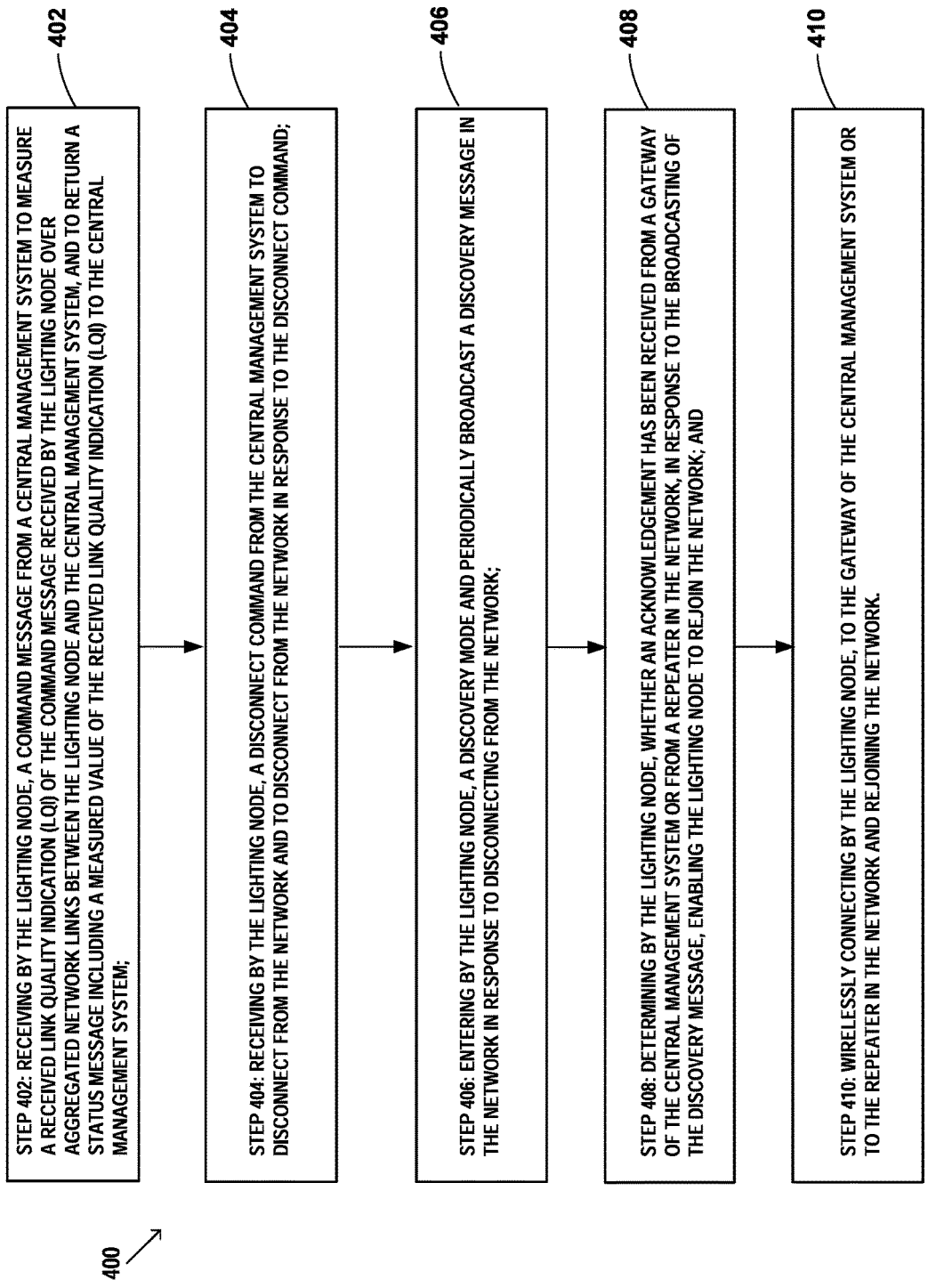

SELF-HEALING LIGHTING NETWORK

FIELD OF THE INVENTION

The invention disclosed broadly relates to monitoring the quality of aggregated control links and lighting node operation in a mesh lighting network. More particularly, the invention relates to self-healing in a lighting network when lighting nodes are affected by poor link quality or experience operational degradation.

BACKGROUND OF THE INVENTION

A system to control a distributed, mesh lighting network is disclosed in the co-pending U.S. patent application Ser. No. 15/709,935, filed Sep. 20, 2017, entitled "System and Method for Bottom-Up Invocation of Control Signal Repeaters in a Mesh Lighting Network", incorporated herein by reference.

During build-out of the mesh lighting network, when a new lighting device is installed, it is in a discovery mode in which it will periodically transmit a discovery message. When a commissioned node, a repeater node, or a gateway to the central management system receives the discovery message with an acceptable node identity and a sufficient link quality indication (LQI), the new lighting device may join the network and is commissioned. After the lighting device has become commissioned in the lighting network, if the network connection degrades too much or the device loses its connection to the network, it reverts to the discovery mode and, once again, will periodically transmit a discovery message.

The mesh lighting network is self-organized via repeaters into a network of lighting nodes with repeaters fanning out control signals from a central management system to each lighting node. Lighting nodes with connectivity through one or more specific repeaters may be set up or dynamically combined to be managed as a group from a CMS or gateway. Each lighting node, in repeater mode, is capable of forwarding control signals to additional lighting nodes. During build-out of the mesh network, as new lighting nodes are installed, the control network automatically selects a node whose repeater function will provide the most efficient or reliable distribution of control signals to the new node or new group of nodes being installed.

Occasionally, network, environmental or other factors, such as gateway or repeater hardware failures, interference due to weather conditions, noisy electronic devices and/or multipath radio propagation impacts or cable cuts, may cause signal degradation or loss in the aggregated links between a lighting node in the network and the central management system.

What is needed is a way to monitor the quality of the aggregated links between a lighting node in mesh lighting network and the central management system, and to automatically command or allow a lighting node experiencing poor link quality, to enter a discovery mode to find a better quality link and rejoin the network.

What is needed is a way to combine link quality monitoring with operational monitoring of a lighting node to determine whether the illumination by a node is failing.

What is needed is a way to combine link quality monitoring with operational monitoring of a lighting node to detect a failing node and to compensate for illumination deficiencies of the failing node.

SUMMARY OF THE INVENTION

Example embodiments of the invention monitor the quality of the aggregated links between a lighting node in a mesh lighting network and a central management system. In accordance with the invention, when the central management system determines that a lighting node is experiencing poor link quality, it automatically commands the lighting node to disconnect from the network and enter the discovery mode to find a better quality link and rejoin the network, in a self-healing process. In addition, when a lighting node finds itself unable to communicate with the network it may decide to disconnect from the network on its own and enter discovery mode.

In accordance with an example embodiment of the invention, the central management system polls lighting nodes with a real time status message (RTSM) command and the polled lighting node measures the received link quality indication (LQI) of the polling command. The received LQI is a characterization of the strength and/or quality of the received polling command frame and indicates any degradation in the aggregated links between the polled lighting node and the central management system. The polled lighting node acknowledges the command by transmitting back to the central management system a real time status message (RTSM) that includes in its payload the lighting node's received link quality indication (LQI) of the polling command.

The central management system captures the received data and link quality indication (LQI) of the polling command as a link quality data point for the responding polled lighting node. The central management system tracks and accumulates the link quality data points received for each polled lighting node. The central management system also computes an average or other statistical characterization of link quality. The statistical characterization of a node's link quality is compared with a threshold value, such as a threshold value for LQI. The comparison may indicate any degradation in the aggregated links between the polled lighting node and the central management system. If sufficient degradation in the link quality is indicated, then the central management system automatically commands the lighting node to disconnect from the network and enter a discovery mode to find a better quality link and rejoin the network. If commands can no longer flow to the lighting node or be accurately received by the lighting node then the lighting node will disconnect itself. When either of these conditions happen, the lighting node continues to operate on its current lighting schedule until it rejoins the network and receives a schedule update from the central management system.

If the discovery node is within radio range of a gateway, a new link may be formed with the gateway if the link quality indication (LQI) of the link is greater than a threshold discovery LQI. If the discovery node is beyond radio range of a gateway, the discovery node may then broadcast a repeater request message to nearby commissioned nodes. The central management system may permit a nearby commissioned node to become a repeater for the discovery node, and form a new link, if the link quality indication (LQI) of the link is greater than a threshold discovery value LQI.

In an example embodiment of the invention, operational monitoring of a lighting node may be included in the process of link quality monitoring. The lighting node may report its illumination and operational status in the payload of the real time status message (RTSM), along with the lighting node's received link quality indication (LQI), in response to a polling command. The central management system receives the illumination and operational status of the responding lighting node to determine whether the illumination by the node is failing.

There are numerous embodiments possible for this invention, including embodiments that expand the concept of self-healing from a single node to groups of nodes that operate cooperatively to achieve a functional objective in the face of node degradation or failure. In a particular grouping example embodiment of the invention, upon determining that the node's operation is failing, the central management system may optionally control the operation of nearby lighting nodes to compensate for any illumination deficiencies of the failing node. If the central management system detects a node problem, then nearby nodes may be logically grouped and their lighting characteristics (intensity and color) changed and lighting direction controlled to compensate for illumination and color quality issues. The central management system monitors operation of the lighting node with the real time status message command, and receives the real time status message including an indication of status of the operation of the lighting node. The central management system compares the indication of status of the operation from the lighting node with an operational threshold value. When the status of the operation from the lighting node is indicated by the comparison as insufficient, the central management system designates one or more lighting nodes nearby the insufficient or degraded lighting node, as comprising a new lighting node group that includes the degraded lighting node. The central management system transmits one or more compensate commands to one or more lighting nodes in the new group, to modify its operation to compensate for the insufficiency of lighting due to a degraded node.

In accordance with an example embodiment of the invention, the central management system may compile a map of the accumulated link quality data points along with any illumination and operational status received for all of the polled lighting nodes, to map out the overall health of the network.

DESCRIPTION OF THE FIGURES

FIG. 1B illustrates the example network of FIG. 1A, showing the CMS determining that Node N5 has poor link quality and in response, sending a command to Node N5 to disconnect from the control network and enter the discovery mode to find a better quality link and rejoin the network.

FIG. 2A illustrates an example sequence diagram of the operation of the network shown in FIGS. 1A to 1F, showing the CMS determining that Node N5 has poor link quality and in response, sending a command to Node N5 to disconnect from the control network and enter the discovery mode to find a better quality link and rejoin the network.

FIG. 2B illustrates an example sequence diagram following the sequence shown in FIG. 2A, showing the discovery lighting node N5 reconnecting to the network via the higher quality link L5 to the commissioned node repeater N3 and rejoining the network.

FIG. 3A illustrates an example network diagram of the central management system (CMS) connected over a wired or wireless connection to a gateway (GW) that wired or wirelessly communicates with a plurality of lighting nodes in a network. A commissioned lighting node N5 is shown with its illumination failing.

FIG. 4 illustrates an example sequence diagram of the operation of the network shown in FIGS. 3A to 3D, showing the central management system monitoring operation of the lighting node with the real time status message and associated commands, and receiving the real time status message including an indication of status of the operation of the lighting node from the degraded lighting node. The central management system is shown transmitting compensate commands to at least one of the one or more lighting nodes in the newly formed group, to modify the lighting node's operation to compensate for the insufficiency of the degraded lighting node.

FIG. 6A is an example flow diagram of steps performed by the lighting node for encoding a message.

DISCUSSION OF THE PREFERRED EMBODIMENTS

Example embodiments of the invention monitor the quality of the aggregated links between a lighting node in a distributed, mesh lighting network and a central management system. The operation of the mesh lighting network and central management system are disclosed in the co-pending U.S. patent application Ser. No. 15/709,935, filed Sep. 20, 2017, entitled "System and Method for Bottom-Up Invocation of Control Signal Repeaters in a Mesh Lighting Network", incorporated herein by reference. The mesh lighting network is self-organized via repeaters into a network of lighting devices with repeaters fanning out control signals from the central management system to each lighting device. Each lighting device, in repeater mode, is capable of forwarding control signals to additional lighting devices. During build-out of the mesh network, as new lighting devices are installed, the control network automatically selects a device whose repeater function will provide the most efficient or reliable distribution of control signals to the new device or new group of devices being installed.

In accordance with the invention, the central management system polls a lighting node in the mesh lighting network, sending a command message for the lighting node to measure a link quality indication (LQI) of the received command message. The lighting node returns a status message, including in its payload the measured LQI. The central management system computes from the lighting node's status messages, a statistical characterization of the link quality of the lighting node and compares it with a threshold quality value. If the comparison indicates sufficient degradation in link quality, the central management system automatically transmits a disconnect command to the lighting node. In response, the lighting node disconnects and enters a discovery mode to find a better quality link to rejoin the network. In addition, when a lighting node finds itself unable to communicate with the network it may decide to disconnect from the network on it's own and enter discovery mode.

In example embodiments of the invention, the central management system combines link quality monitoring with operational monitoring of a lighting node to determine whether the illumination by a node is failing. The central management system monitors operation of the lighting node with the real time status message and associated commands, and receives the real time status message including an indication of status of the operation of the lighting node from the lighting node, as well as the lighting node's received link quality indication (LQI) of the polling command.

In example embodiments of the invention, if a node has illumination problems or node failure occurs, then nearby nodes may be dynamically included in a new grouping of lights and their light output, color and/or orientation adjusted to mitigate or alleviate any illumination or color deficit issues caused by a degraded lighting node.

Figure 1A:
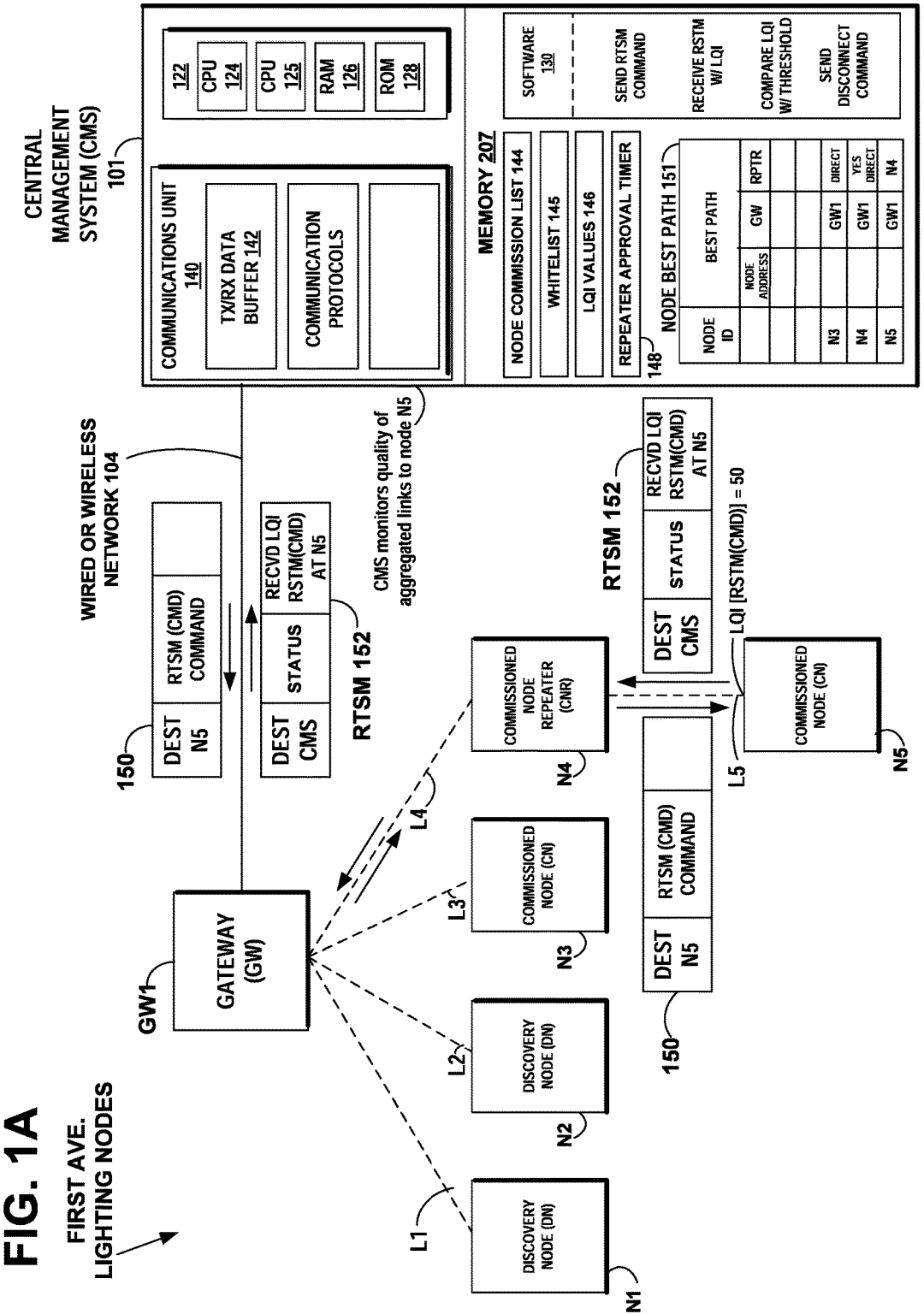
FIG. 1A illustrates an example network diagram of the central management system (CMS) connected over a wired or wireless connection to a gateway (GW) that wired or wirelessly communicates with a plurality of lighting nodes in a network. The central management system polls lighting nodes with a real time status message (RTSM) command and the polled lighting node measures the received link quality indication (LQI) of the polling command. The received LQI is a characterization of the strength and/or quality of the received polling command frame and indicates any degradation in the aggregated links between the polled lighting node and the central management system. The polled lighting node acknowledges the command by transmitting back to the central management system a real time status message (RTSM) that includes in its payload, the lighting node's received link quality indication (LQI) of the polling command.

FIG. 1A illustrates an example network diagram of the central management system (CMS) 101 connected over a wired or wireless connection 104 to a gateway GW1 that wired or wirelessly communicates with a plurality of lighting nodes N1, N2, N3, N4, and N5 in a control network. There may be a plurality of lighting node devices in the distributed lighting network 104. Lighting node devices N1, N2, N3, N4, N5, are in a branch along First Ave. Other branches, not shown, may light up parks, bridges, bike and hiking trails, parking lots, etc. Each lighting device includes an LED lighting array and digital components shown in FIG. 5.

The central management system 101 polls lighting nodes, such as node N5, with a real time status message (RTSM) command 150 and the polled lighting node N5 measures the received link quality indication (LQI) of the polling command 150. The received LQI is a characterization of the strength and/or quality of the received polling command frame 150 and indicates any degradation in the aggregated links, for example L4 and L5, between the polled lighting node N5 and the central management system 101. The polled lighting node N5 acknowledges the command 150 by transmitting back to the central management system 101 a real time status message (RTSM) 152 that includes in its payload, the lighting node's received link quality indication (LQI) of the polling command 150. In addition (but not shown), repeater node N4 may optionally measure link quality about frames from N5 received by N4 and also report that to the CMS within the RTSM message 152.

Link Quality Indication (LQI) is a characterization of the strength and/or quality of a received frame, which is typically represented by an integer scale ranging from zero to 255. The reason for a low LQI value can be twofold: a low signal strength and/or high signal distortions that reduce the accuracy expectations of a received frame, for example by interference due to weather conditions and/or multipath propagation impacts and/or noise impacting cable runs. In some embodiments a low LQI value may be an indication of poor link quality. Therefore, a low LQI value may trigger a request for frame retransmission. High LQI values, however, are typically designed to indicate a sufficient signal strength and low signal distortions in a received frame. In this case the expectations are that the frame contains accurate data. Typically the LQI value is almost always high, for example 255, for scenarios with very low signal distortions and a signal strength much greater than a defined sensitivity level. In this case, the packet error rate tends towards zero and an increase of the signal strength, i.e. by increasing the transmission power, cannot decrease the error rate any further. This is only one example of the specification of LQI values. In other embodiments the meaning of the scale may be reversed and the range of LQI numbers may be different.

Received signal strength indication (RSSI) or energy detection (ED) may be used to evaluate the signal strength and also employed to determine if link performance is acceptable. The received signal power, as indicated by received signal strength indication (RSSI) value or energy detection (ED) value, may not, by itself, characterize the signal quality and the ability to decode a signal. They are two of a number of measured or defined metrics that may be used to decide if a link is suitable for reliable data transmission.

LQI and RSSI/ED may be applied together, depending on the optimization criteria. If a low frame error rate (corresponding to a high throughput) is the optimization criterion, then the LQI value may be taken into consideration. If, however, the target is a low transmission power, then the RSSI/ED value is also helpful. Various combinations of LQI and RSSI/ED are possible for making communication decisions. As a rule of thumb, information on RSSI/ED is useful in order to differentiate between links with high LQI values. However, transmission links with low LQI values may be discarded from decisions, even if the RSSI/ED values are high, since RSSI/ED is merely information about the received signal strength, whereas the source of the signal strength may be an interferer.

FIG. 1B illustrates the example network of FIG. 1A, showing the CMS 101 determining that Node N5 has poor link quality and in response, sending a command 154 to Node N5 to disconnect from the control network and enter the discovery mode to find a better quality link and rejoin the network.

The central management system 101 captures the received link quality indication (LQI) of the polling command 150, as a link quality data point for the responding polled lighting node N5. The central management system 101 tracks and accumulates the link quality data points received for each polled lighting node N1, N2, N3, N4, and N5 and computes an average or other statistical characterization of the node's link quality. The statistical characterization of the node's link quality is compared with a threshold value, such as a threshold value for LQI. The comparison may indicate any degradation in the aggregated links L4 and L5 between the polled lighting node N5 and the central management system 101.

If degradation in the link quality is indicated, then the central management system 101 automatically commands the lighting node N5 by sending the disconnect command 154 to node N5 to disconnect from the network, and enter a discovery mode to find a better quality link and rejoin the network. When this happens, the lighting node N5 continues to operate on its current lighting schedule until it rejoins the network and receives a schedule update from the central management system 101.

Figure 1C:
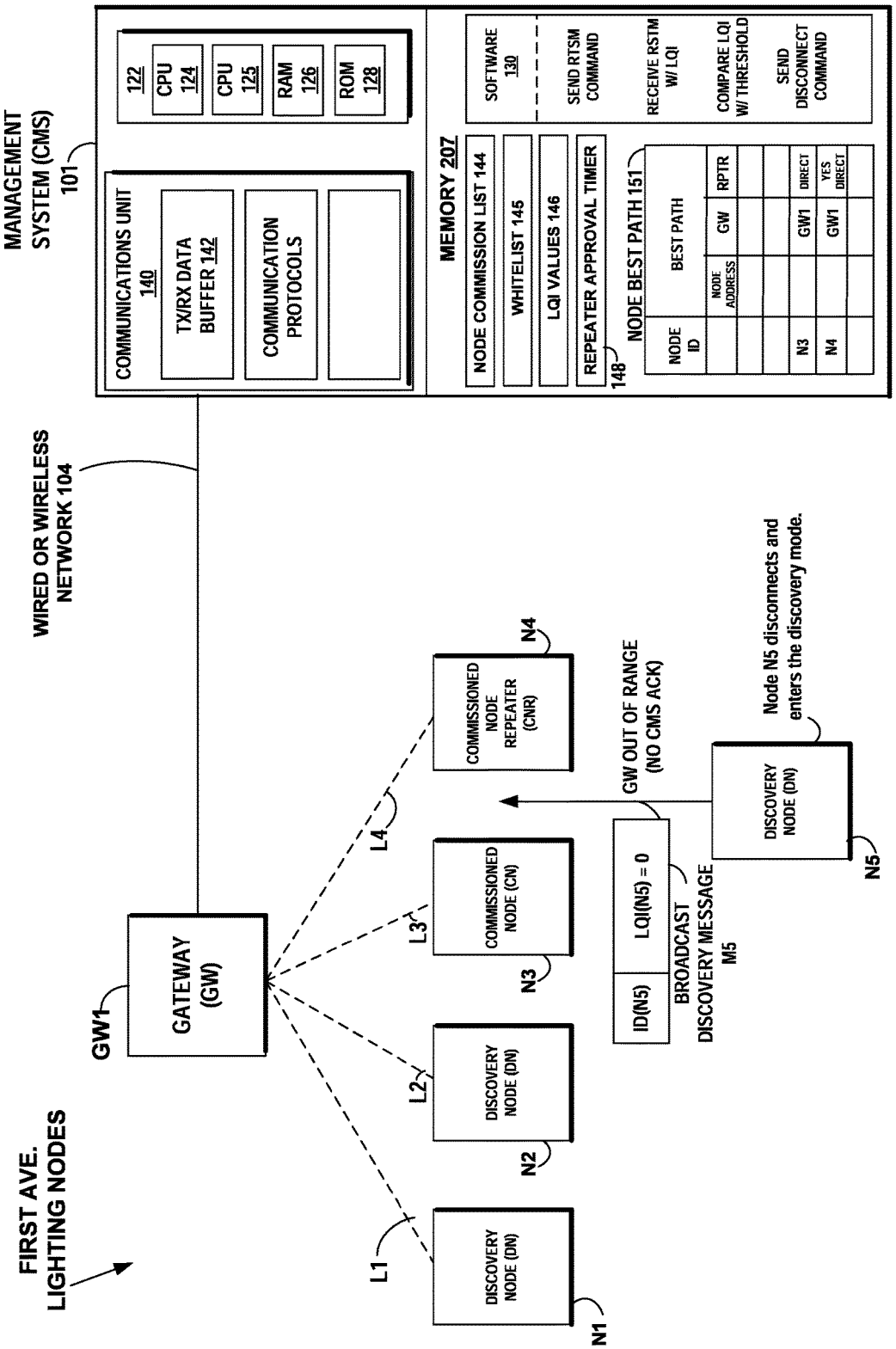
FIG. 1C illustrates the example network of FIG. 1B, showing Node N5 disconnecting from the control network and entering the discovery mode. The figure shows the discovery lighting node N5 attempting to wirelessly broadcast a discovery message to the wireless gateway GW1, however, the discovery node N5 is beyond radio range of the gateway GW1.

FIG. 1C illustrates the example network of FIG. 1B, showing Node N5 disconnecting from the control network and entering the discovery mode. Node N5 reverts to the discovery mode and begins to periodically transmit a discovery message M5. The figure shows the discovery lighting node N5 attempting to wirelessly broadcast a discovery message M5 to the wireless gateway GW1, however, the discovery node N5 is beyond radio range of the gateway GW1.

Figure 1D:
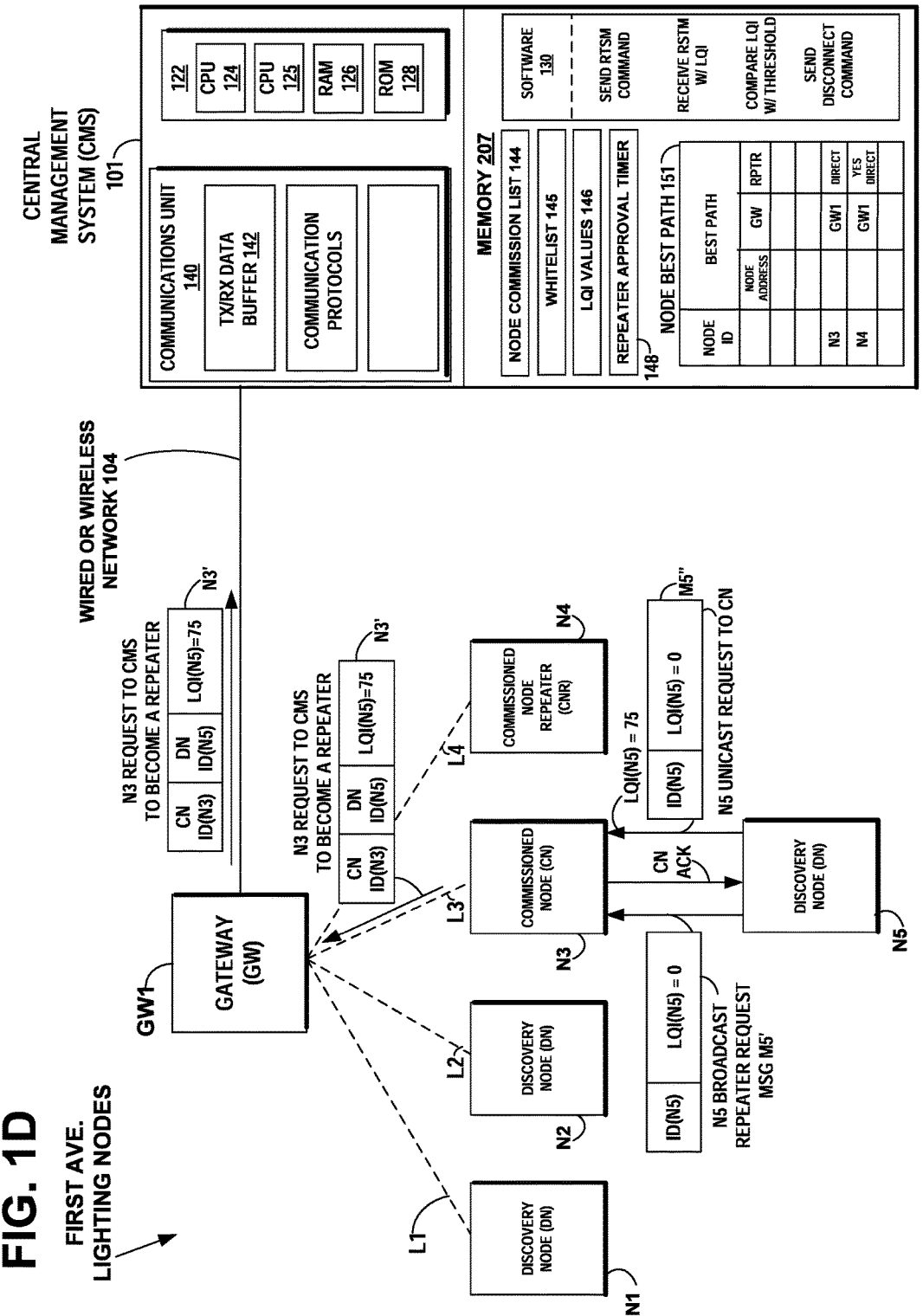
FIG. 1D illustrates the example network of FIG. 1C, showing the discovery node N5 then broadcasting a repeater request message that is received by a nearby commissioned node N3.

FIG. 1D illustrates the example network of FIG. 1C, showing the discovery node N5 continuing in a mode of being beyond radio range of the gateway GW1. Node N5 continues in the discovery mode and periodically broadcasts a repeater request message M5' that is received by a nearby commissioned node N3, which replies with an acknowledgement ACK. It is possible that other commissioned nodes may also respond with acknowledgements. The discovery node N5 then transmits a unicast request message M5" to the nearby commissioned node N3. In response, the commissioned node N3 transmits a request N3' to the central management system (CMS) to become a repeater for the discovery node N5.

The CMS Repeater Approval Timer (RAT) 148 is triggered whenever the CMS 101 sends the command to a commissioned node (CN) to become a commissioned node repeater (CNR), to halt the creation of repeaters for some time period (typically 5 minutes). This ensures that all discovery messages that meet some efficiency or reliability criteria (in whitelist 145 and ≥Discovery LQI) will have time to be received by the CMS and be added to the commissioning queue, whether they are in range of the gateway or are forwarded via other repeaters. The RAT timer also resets whenever a discovery message is received.

Figure 1E:
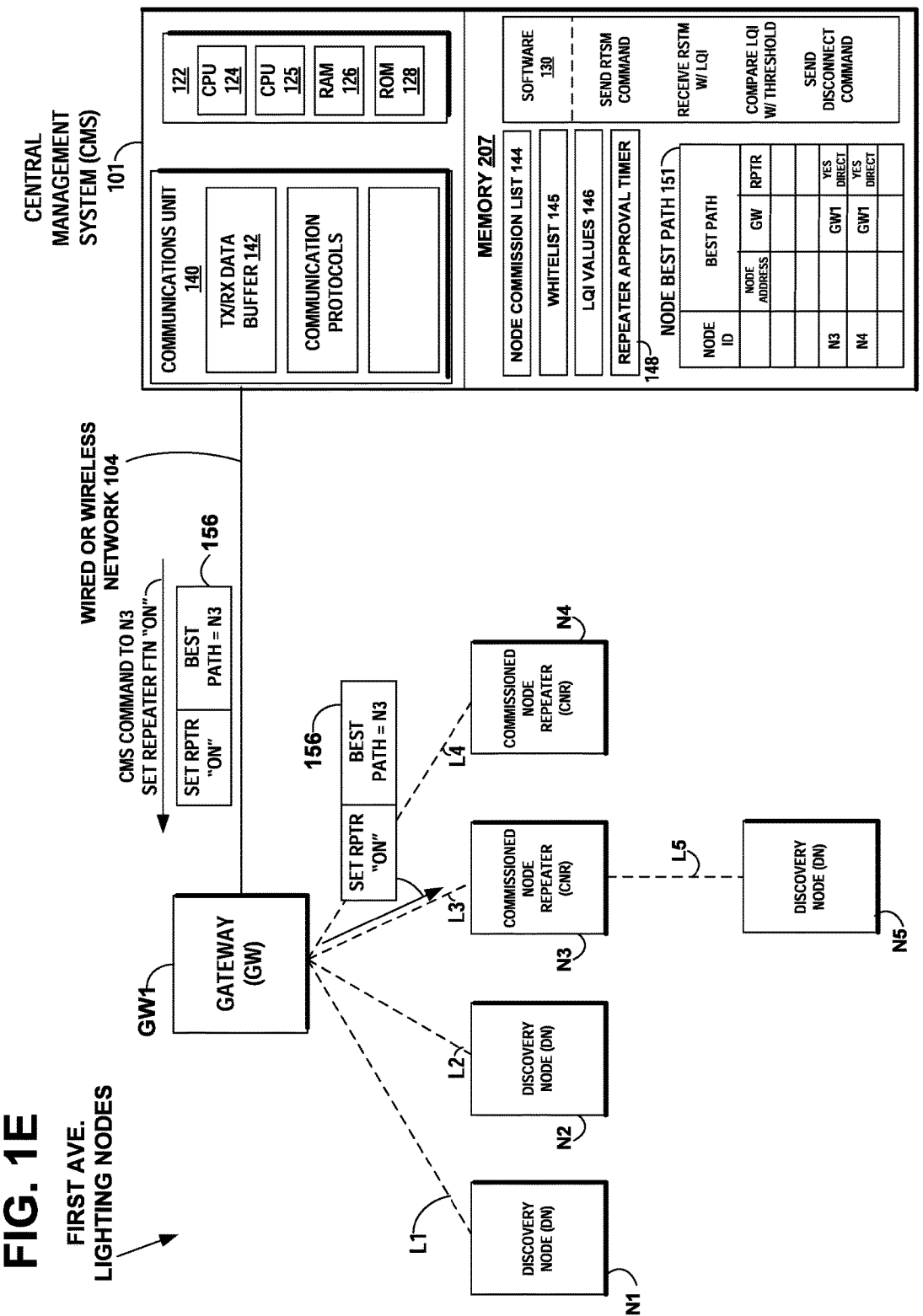
FIG. 1E illustrates the example network of FIG. 1D, showing the nearby commissioned node N3 receiving a command from the CMS to turn on its repeater function so that it can serve as a repeater for the discovery node N5.

FIG. 1E illustrates the example network of FIG. 1D, showing the nearby commissioned node N3 receiving a command 156 from the CMS to turn on its repeater function so that it can serve as a repeater for the discovery node N5. The central management system (CMS) verifies that the discovery node N5's ID is in the whitelist 145, processes the request for discovery node N5 to determine the most efficient or reliable path (network) to use and log this best path, verifies that the repeater approval timer (RAT) 148 has expired, and sends an "operating parameter" command with "Repeater=True", back to the selected commissioned node N3, commanding it to become a repeater (CNR). The central management system (CMS) then resets the RAT timer 148.

The repeater approval timer 148 in the central management system 101 starts the delay interval each time a command is transmitted to another lighting node to invoke the repeater function in the another lighting node, thereby automatically preventing an excessive number of repeaters being created in the wireless network.

Figure 1F:
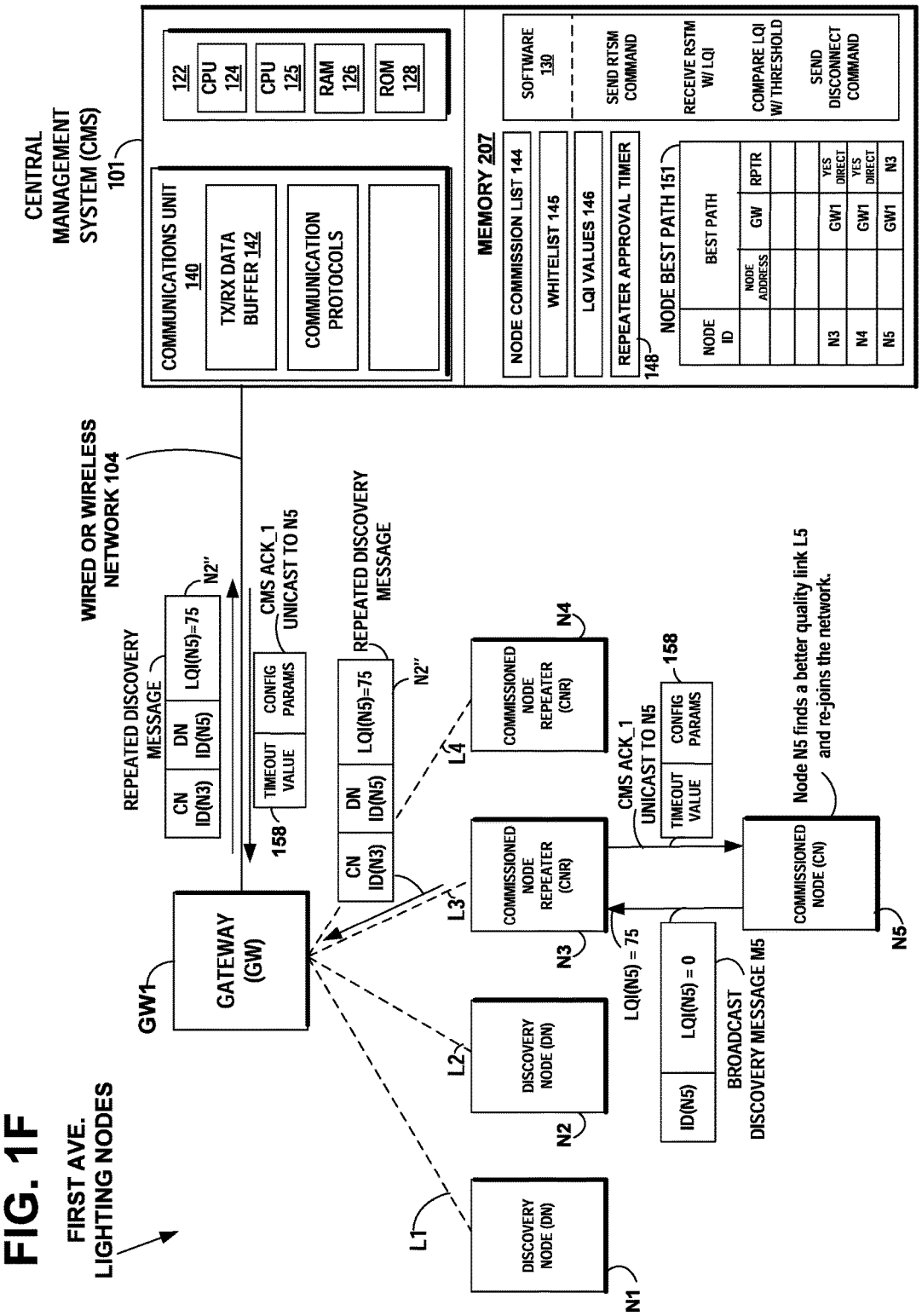
FIG. 1F illustrates the example network of FIG. 1E, showing Node N5 discovering a better quality link L5 to the commissioned node repeater N3 and rejoining the network.

FIG. 1F illustrates the example network of FIG. 1E, showing Node N5 discovering a better quality link to the commissioned node repeater N3 and rejoining the network. The figure shows the discovery node N5 transmitting a discovery message M5 to the commissioned node repeater N3 for forwarding to the gateway GW1 and the central management system (CMS). The repeated discovery message N2' includes the received LQI or some other efficiency metric related to the discovery message as it was received by the repeater N3. The CMS 101 processes the single discovery message received via the repeater, sends an ACK_1, if the received LQI, within the message payload of this example, is greater than or equal to the threshold Discovery LQI. The CMS then adds the node N5 to the commissioning Queue and logs it in the device table. The Repeater Approval Timer (RAT) 148 is reset.

The central management system 101 includes a processor 122 comprising a dual central processor unit (CPU) or multi-CPU 124/125, a random access memory (RAM) 126 and read only memory (ROM) 128. The memories 126 and/or 128 include computer program code, including control software 130. The memory 207 in the central management system 101 includes a node best path list 151. The memory 207 in the central management system 101 includes a node commission list 144, a whitelist 145, a set of link quality indication (LQI) threshold values 146 or contains other efficiency and reliability metrics, and a repeater approval timer (RAT) 148. The central management system 101 includes a wired or wireless communications unit transceiver 140 that includes a transmit/receive (TX/RX) buffer 142, which is configured to communicate via gateway GW1 with the lighting node devices via the network 104. The communications unit 140 includes IEEE 802.xx and other communication protocols, depending the connectivity requirements between the CMS (101) and the gateway (GW1). Other examples of the network 104, include twisted pair, coax cable, Ethernet, Infrared, RFID, WiFi, Bluetooth, Bluetooth Low Energy, ultra-narrow band communications protocol from Sigfox, LTE-M, any Low Power Wireless Area Network (LPWAN) protocol, any M2M communication protocol, cellular, IEEE 802.15.4 RF, or LoRa Low Power Wide Area Network. The central management system 101 may include a radio communications unit 140 that includes a transmit/receive (TX/RX) buffer 142 and optionally a cell phone transceiver and a WiFi transceiver to communicate with the lighting node devices 104 via radio communications units in the devices.

The central management system (CMS) 101 includes program software 130 in the memory 207, to send commands and interrogate RTSM responses from a lighting node. The program software 130 receives the RTSM with the link quality indication (LQI) or in other embodiments, other efficiency and reliability metrics. The program software 130 compares the LQI with a threshold LQI value. The program software 130 then sends a disconnect command to the lighting node if the LQI is less than the threshold value.

In one example embodiment, a node addressing scheme may be used by the CMS 101 to commission discovery nodes and to control and communicate with commissioned nodes and commissioned node repeaters. An example addressing scheme for the lighting nodes may include an address with fields for a customer ID, site ID, network ID, lighting group ID, which may indicate services grouping (parks, trails, streets, bridges, parking lots etc.) or functional grouping (motion detectors or cameras associated with the lighting node), device node ID, nearest street address, GPS location and device type, which may indicate device's processor size and storage size. Either an installer or operation of a pre-existing lighting plan will have stored into the memory of a newly installed lighting node, one or more of the values for customer ID, site ID, network ID, lighting group ID, device node ID, nearest street address, GPS location, device type, processor size and storage size. When a discovery node broadcasts a discovery message, including its stored the address, which is received by the gateway GW1 and CMS, the CMS stores the address in the node best path table 151. Every commissioned node served by the CMS, has its address stored in the node best path table 151, along with the address or identity of the gateway and any repeater through which the node communicates with the CMS.

In accordance with an example embodiment of the invention, the central management system 101 may compile a map of the accumulated the link quality data points received for all of the polled lighting nodes N1, N2, N3, N4, and N5, to map out the overall health of the network. The central management system may cause a notice to be sent of the link quality of any of the lighting nodes N1, N2, N3, N4, and N5.

FIG. 2A illustrates an example sequence diagram of the operation of the network shown in FIGS. 1A to 1F, showing the CMS 101 determining that Node N5 has poor link quality and in response, sending a command to Node N5 to disconnect from the control network and enter the discovery mode to find a better quality link and rejoin the network.

The central management system 101 polls lighting nodes, such as node N5 (which begins in this example as a commissioned node), with a real time status message (RTSM) command 150, for example, and the polled lighting node N5 measures the received link quality indication (LQI) of the polling command 150. This LQI is the link quality of frames received at node N5 from node N3. The polled lighting node N5 acknowledges the command 150 by transmitting back to the central management system 101 a real time status message (RTSM) 152 that includes in its payload, the lighting node's received link quality indication (LQI) of the polling command 150. In addition, the link quality may also be reported for the frames received at node N3 from N5. Optionally node N5 may also be forced into discovery, if its link quality has degraded sufficiently. In other embodiments of the invention, node N5 may be forced into discovery, if an LQI is below a threshold for messages passing in either direction on the L5 link.

If the CMS 101 determines that Node N5 has poor link quality from link L5, it sends a disconnect command 154 to Node N5 to disconnect from the control network and enter the discovery mode to find a better quality link and rejoin the network. If N5 can no longer receive meaningful frames from N3, it will eventually time out and enter discovery mode.

The discovery lighting node N5 is shown initially attempting to wirelessly broadcast a discovery message M5 to the wireless gateway GW1, however, the discovery node N5 is beyond radio range of the gateway GW1. The discovery node N5 then broadcasts a repeater request message M5' that is received by a nearby commissioned node N3, which replies with an acknowledgement ACK. It is possible that other commissioned nodes may also respond with acknowledgements. The discovery node N5 then transmits a unicast request message M5" to the nearby commissioned node N3. In response, the commissioned node N3 transmits a request N3' to the central management system (CMS) to become a repeater for the discovery node N5. The central management system (CMS) verifies that the discovery node N5's ID is in the whitelist 145, processes the request for discovery node N5 to determine the most efficient or reliable path (network) to use and log this best path, verifies that the repeater approval timer (RAT) 148 has expired, and sends an "operating parameter" command with "Repeater=True", back to the selected commissioned node N3, commanding it to become a repeater (CNR). The central management system (CMS) then resets the RAT timer 148.

FIG. 2B illustrates an example sequence diagram following the sequence shown in FIG. 2A, showing the discovery lighting node N5 reconnecting to the network via the higher quality link L5 to the commissioned node repeater N3 and rejoining the network. The figure shows the discovery node N5 transmitting a discovery message M5 to the commissioned node repeater N3 for forwarding to the gateway GW1 and the central management system (CMS). The repeated discovery message N3" includes the received LQI or some other efficiency metric related to the discovery message as it was received by the repeater N3. The CMS 101 processes the single discovery message received via the repeater, sends an ACK_1, if the received LQI, within the message payload of this example, is greater than or equal to the threshold Discovery LQI. The CMS then adds the node N5 to the commissioning Queue and logs it in the device table. The Repeater Approval Timer (RAT) 148 is reset.

In example embodiments of the invention, the best path for maximizing reliability or speed of communication between a lighting node and the central management system CMS, may be based on other metrics than the received link quality indication (LQI) of the discovery message. Example alternate metrics may include propagation delay of the discovery message, respective service group ID of the lighting node, respective functional group ID of the lighting node, respective processor size of the lighting node, and respective storage size of the lighting node.

Another metric may be the relative priority of network traffic of the lighting group of which the lighting node is a member. For example, whichever node among several, has the larger processor, larger amount of storage, or better connections, would be selected by the CMS to handle the most important traffic having the highest relative priority, such as safety and security traffic from nodes associated with security cameras or motion detectors. If the lighting node is a member of a services group with security cameras, for example, then the lighting node may have traffic that is more important and is a higher relative priority than traffic from another grouping of simple street lights. Accordingly, the repeater selection criterion used by the CMS to support prioritized load balancing, gives the node associated with cameras, for example, the faster path through the more powerful repeater, for a more efficient communication path from the node to the CMS, thereby maximizing reliability or speed of communication between the lighting node and the CMS.

In embodiments of the invention, lighting networks may be designed as a plurality of partitioned lighting groups, where a group identified by a group ID may be composed of lighting nodes performing a specific function and producing network traffic having a relatively high priority. The associated repeaters in the group will only support nodes in the group having that specific function, as identified by the group ID. An example is lighting nodes having camera connections or motion detector triggers, which produce network traffic having a relatively high priority. In such cases, network traffic of a given relative priority may be directed to specific repeaters using the group ID and, when necessary, nodes of this group may be activated as repeaters to only provide connectivity to specifically dedicated groups of nodes having the same group ID, such as lights in a park or highway lights. Similarly, lighting on a bridge may utilize only repeaters dedicated for that purpose. This provides a significant advantage. For example, when activating repeaters for bridge lights or re-balancing bridge lighting, repeater creation and re-balancing activity can remain unaffected in other non-bridge lighting node groupings.

In embodiments of the invention, the CMS may employ multiple RATs and use them to assign different delay values for the Repeater Approval Timer (RAT) 148 to the different lighting groups, where speed is important either for initial group build-out, re-balancing of traffic flows, or recovery from an outage. This has the advantage that waits for the RAT to expire may be localized within lighting groups and not network wide. The rate of formation of new repeaters in a lighting group depends, in part, on the RAT 148 value assigned by the CMS to the group. To accelerate the initial creation of repeaters in a group, the CMS may dynamically change RAT values and assign a short duration RAT delay value when the rollout of the lighting group is started. Then, after a relatively small number of repeaters have been created in the group, in order to limit overpopulation of the repeaters in the group, the CMS may assign a longer duration RAT delay value.

The repeater approval timer (RAT) provides at least one of variable delay intervals for invoking the repeater function in lighting nodes of at least one individual group of lighting nodes or different delay intervals for invoking the repeater function in lighting nodes of different ones of a plurality of groups of lighting nodes.

In this manner, multiple Repeater Approval Timers 148 may be created by the CMS, with each separate RAT 148 associated with a respective service group, functional group, a group of geographically co-located lighting nodes, or any grouping of lighting nodes specified in a lighting plan. Different RAT timers may also have different delay values assigned by the CMS, which may vary from long to short delays, to adjust how quickly or often new repeaters can be activated, thereby accommodating different relative priorities of network traffic handled by respective groups of repeaters.

FIG. 3A illustrates an example network diagram of the central management system (CMS) 101 connected over a wired or wireless connection 104 to a gateway GW1 that wired or wirelessly communicates with a plurality of lighting nodes N1, N2, N3, N4, N5 in a network. Commissioned Node N2 illuminates area A2, commissioned Node N3 illuminates area A3 and commissioned Node N5 illuminates area A5. The commissioned lighting node N5 is shown with its illumination failing.

Figure 3B:
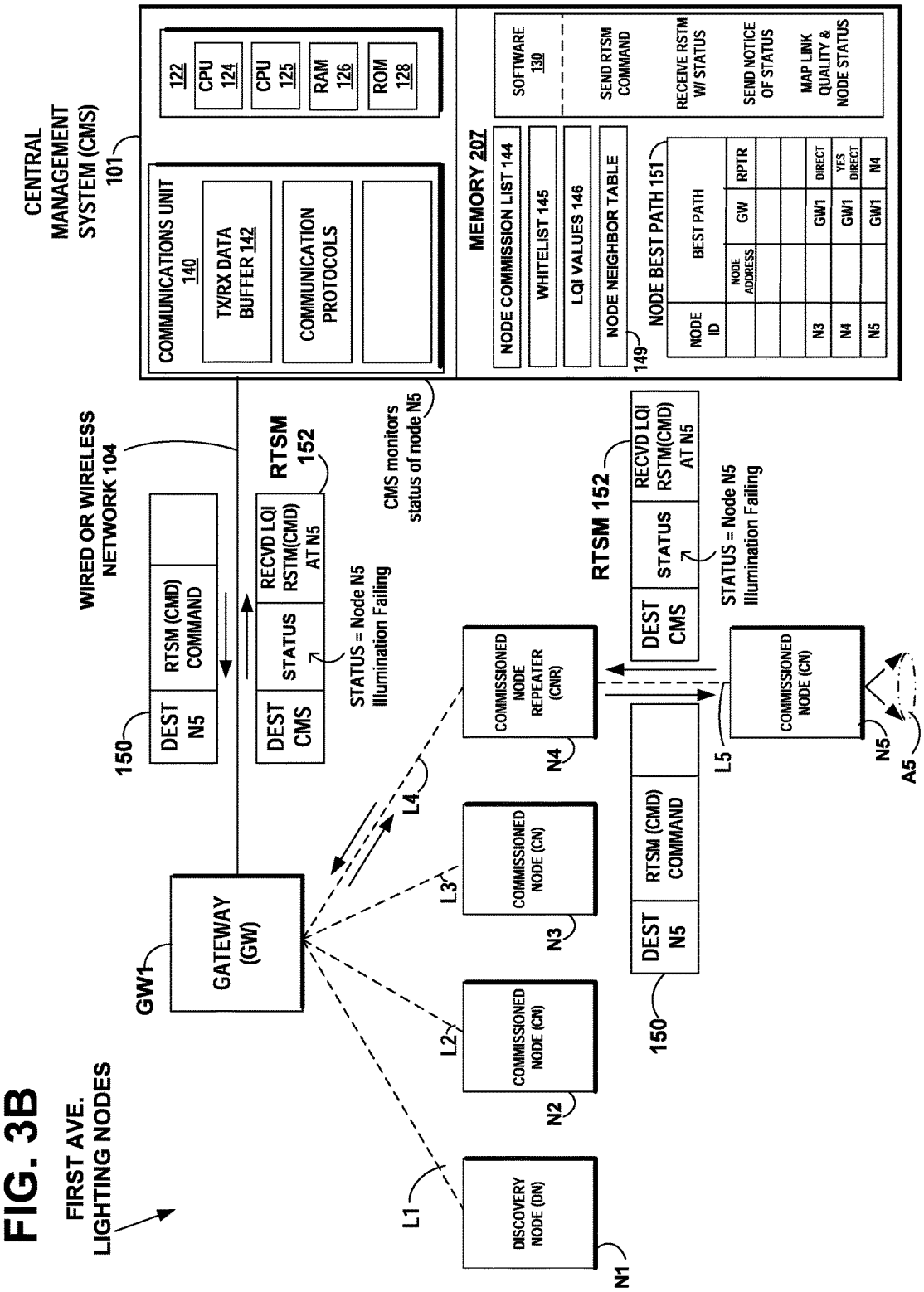
FIG. 3B illustrates the example network of FIG. 3A, showing the central management system combining link quality monitoring with operational monitoring of a lighting node to determine whether the illumination by a node is failing. The central management system monitors operation of the lighting node with the real time status message and associated commands, and receives the real time status message including an indication of status of the operation of the lighting node from the lighting node, as well as the lighting node's received link quality indication (LQI) of the polling command.

FIG. 3B illustrates the example network of FIG. 3A, showing the central management system combining link quality monitoring with operational monitoring of a lighting node to determine whether the illumination by a node is failing. The central management system monitors operation of the lighting node with the real time status message and associated commands, and receives the real time status message including an indication of status of the operation of the lighting node from the lighting node, as well as the lighting node's received link quality indication (LQI) of the polling command. The central management system 101 monitors operation of the lighting node N5 using real time status message 150. The figure shows the central management system 101 receiving the real time status message (RTSM) 152 including an indication of status of failing illumination of the lighting node N5 from the lighting node. The central management system may cause a notice to be sent of the operational status of the lighting node. The central management system may compile a map of the accumulated link quality data points along with any illumination and operational status received for all of the polled lighting nodes, to map out the overall health of the network.

Figure 3C:
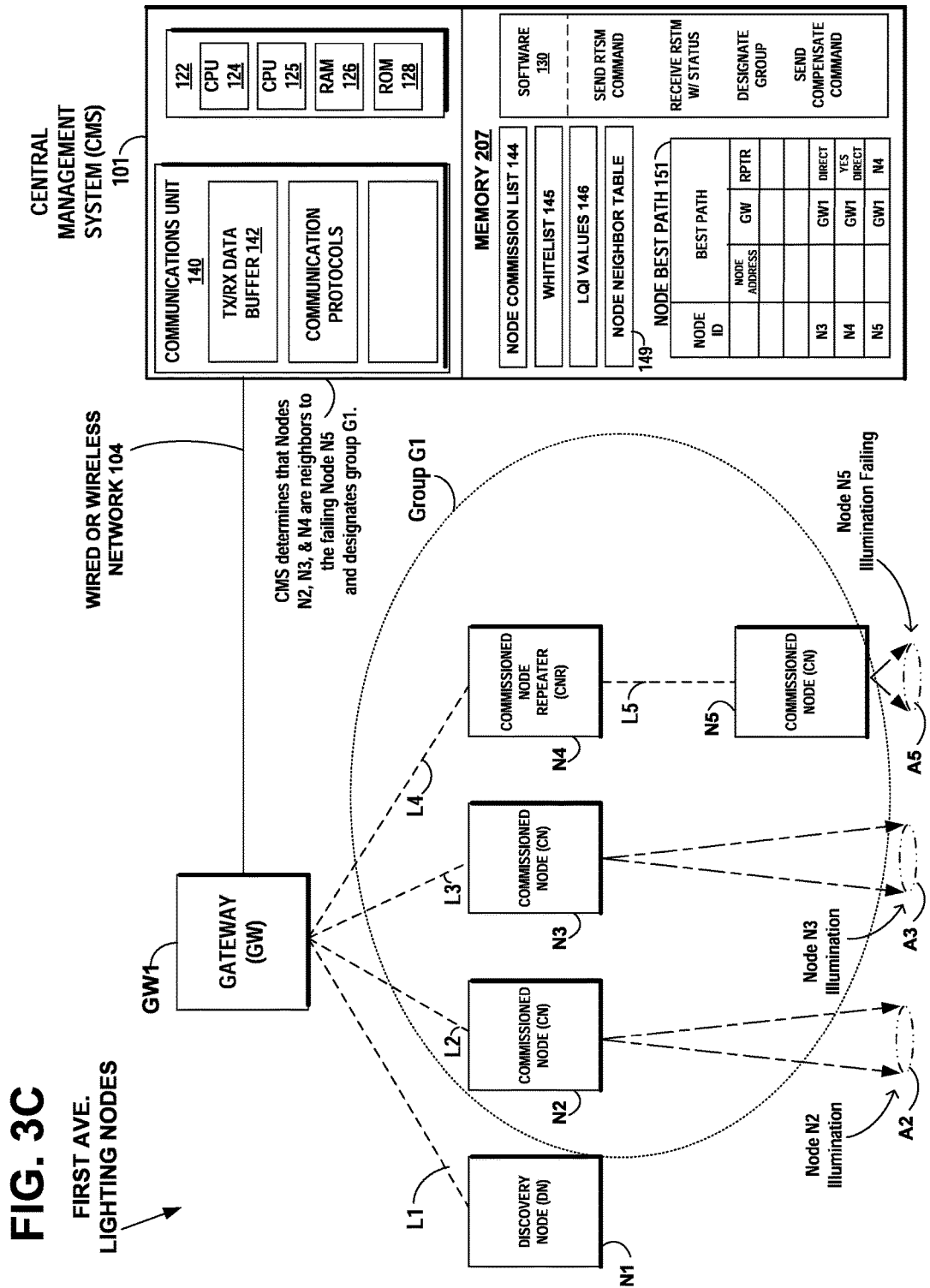
FIG. 3C illustrates the example network of FIG. 3B, showing the central management system comparing the indication of status of the operation from the lighting node with an operational threshold value. When the status of the operation from the lighting node is indicated by the comparison as insufficient or degraded, the central management system designates one or more lighting nodes nearby the degraded lighting node as comprising a new lighting node group which includes the degraded lighting node.

FIG. 3C illustrates the example network of FIG. 3B, showing the central management system 101 comparing the indication of status of the operation from the lighting node N5 with an operational threshold value. When the status of the operation from the lighting node is indicated by the comparison as insufficient, because of illumination failing or color change, the central management system 101 designates one or more lighting nodes N2, N3, and N4 nearby the lighting node N5 as comprising a new lighting node group G1, which includes the failing lighting node N5. The CMS may use node neighbor information compiled in the node neighbor table 149, to designate the one or more lighting nodes N2, N3, and N4 as being nearby the failing lighting node N5.

Figure 3D:
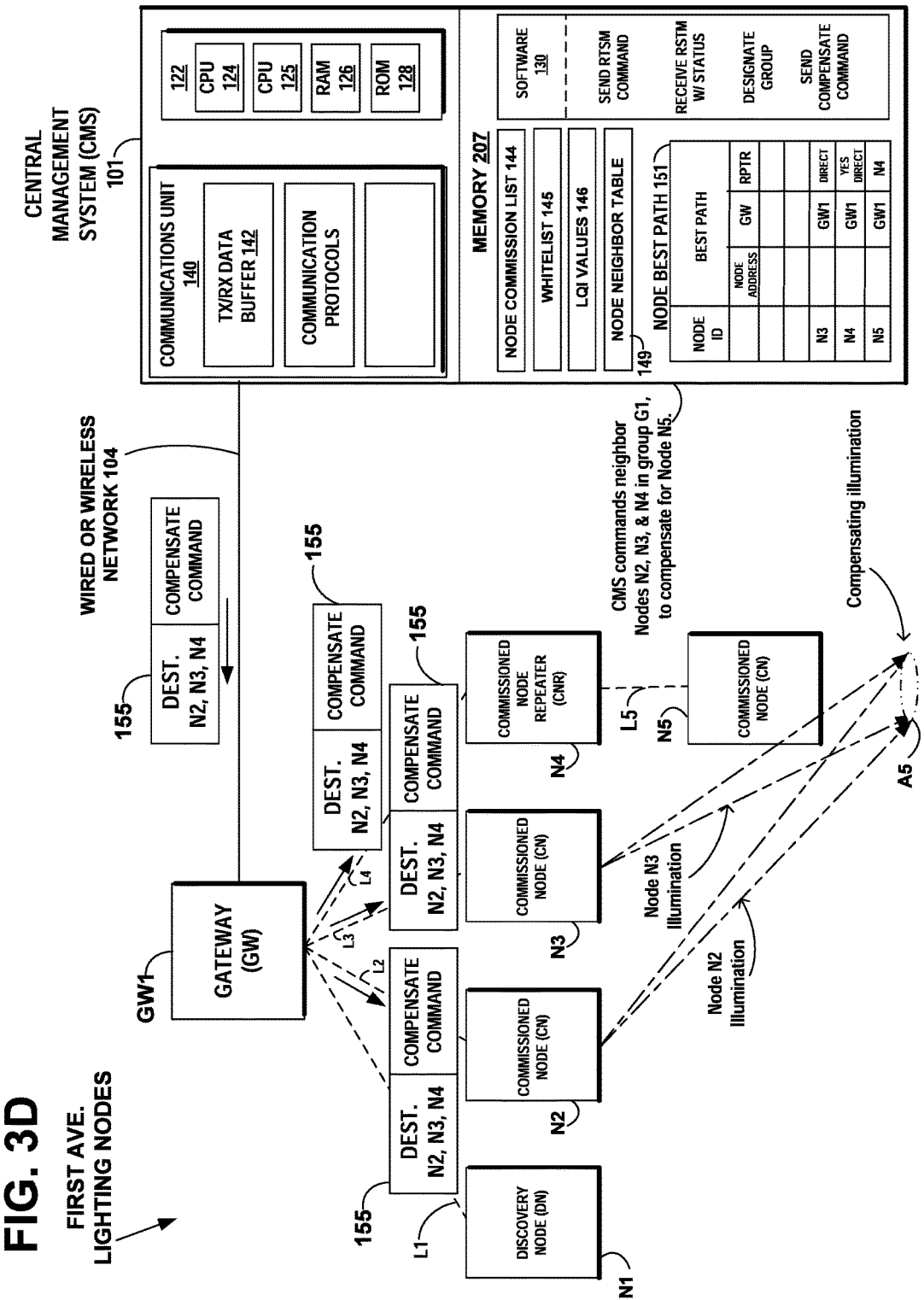
FIG. 3D illustrates the example network of FIG. 3C, showing the central management system transmitting compensate commands to at least one of the one or more lighting nodes in the new group, and to subsequently modify the operation of one or more nearby lighting nodes to compensate for the insufficiency of the degraded lighting node.

FIG. 3D illustrates the example network of FIG. 3C, showing the central management system 101 transmitting a compensate command 155 to the new lighting group nodes N2, N3, and N4, to modify their operation in such a way to compensate for the insufficiency of the lighting node N5, by increasing their intensity/brightness, expanding their illumination area, or redirecting their illumination to the area A5 previously illuminated by node N5. Optimally, grouping may be logically accomplished internally within the CMS and individual commands may be issued from the CMS to the effected lighting nodes to modify their operation. Example modifications may include increased illumination, color change or direction orientation to compensate for an illumination deficiency at node N5.

FIG. 4 illustrates an example sequence diagram of the operation of the network shown in FIGS. 3A to 3D, showing the central management system 101 monitoring operation of the lighting node N5 with a command 150, and receiving the real time status message 152 including an indication of status of the operation of the lighting node N5 from the lighting node N5. The central management system 101 is shown transmitting a compensate command 155 to a newly formed group of lighting nodes N2, N3, and N4, to modify their operation to compensate for the insufficiency of the lighting from node N5.

The concept of "self-healing" may be applied at a node level, for example when a node light output is degraded or the node fails (no light). The node problem may be determined from the illumination and/or operational status data. This data may be analyzed by any number of algorithms to decide if action needs to be taken, such as alerting operations (sending maintenance people a text message etc.) that a node failure is eminent or has occurred and then grouping other (nearby) nodes to compensate for illumination or color deficit problems. In the example, node degradation or node failure has occurred in node N5 and the other nearby nodes were commanded to adjust their light output and/or direction and/or color intensity, etc. to compensate for the lower lighting intensity or color defect occurring as a result of problems at node N5. The nearby nodes may be identified because they are within radio range of node N5. Or the nearby nodes may be identified by nodes reporting who their neighbors are when they are activated, or these nodes may be identified by their GPS coordinates at the CMS, etc. The CMS may use node neighbor information compiled in the node neighbor table 149, to decide which nodes to contact and dynamically form a grouping of nodes operating in unison/cooperatively to mitigate or correct the lighting deficit by the defective node N5.

Figure 5:
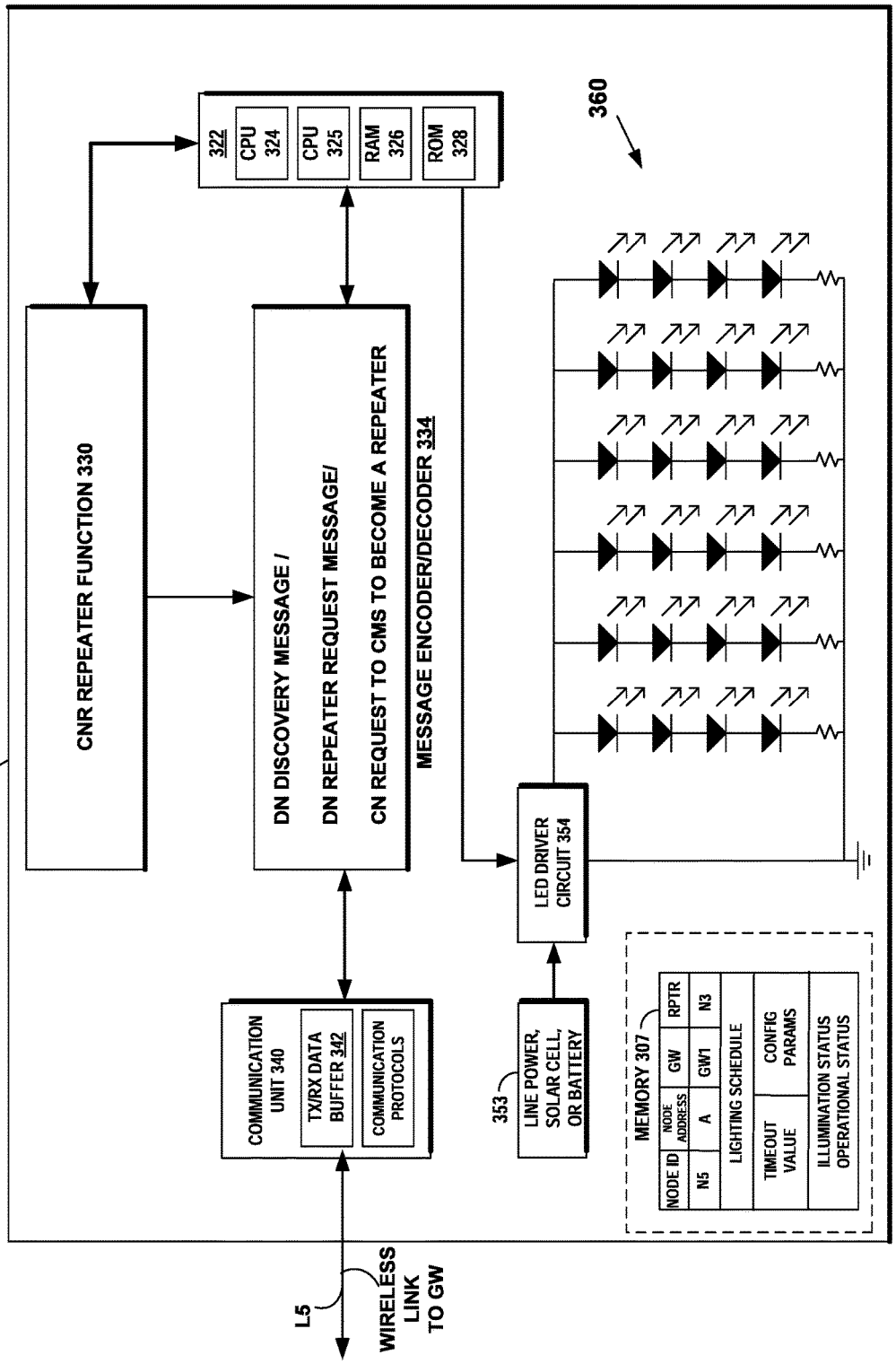
FIG. 5 is an example functional block diagram of the lighting device node N5, in accordance with an example embodiment of the invention.

FIG. 5 is an example functional block diagram of the lighting device node N5, in accordance with an embodiment of the invention, showing an example lighting device N5 connected to the wireless network 104. The lighting node device includes data such as node ID, address, gateway ID, repeater status, illumination status, group affinity, functional characteristics (video usage, motion detector attachments, etc.), other identity characteristics and operational status in its memory 307. The lighting node device includes a wireless communications unit 340 coupled to the encoder/decoder 334, which is configured to broadcast the discovery message in the wireless network 104. The network 104 includes the central management system 101 configured to receive the discovery message, commission the lighting node N1, and provide the timeout value, configuration parameters, and other information. Using LQI information as the criterion, then the best path is considered also the most reliable path. Other reliability or efficiency criteria may be considered for the best path or a combination of criteria.

The example lighting device N5 shown in FIG. 5, includes a wireless communications unit transceiver 340 that includes a transmit/receive (TX/RX) buffer 342, which is configured to communicate with the central management system 101 via the network 104. The communications unit 340 includes any needed communication protocol to communicate with a CMS 101 over the network L1. The device N5 activates the LED driver circuit 354 controlled by the processor 322, to power the LED light array 360 with either line power, solar cell/photovoltaic power, or battery power 353. Depending on the control parameters in a lighting schedule, the light array 360 may be turned on, its illumination level adjusted, its color changed, or turned off, in response. The LED driver circuit 354 controls the voltage and current patterns sent to each LED element (Red, Green, Blue) in the LED array 360. The LED array 360 may be a single light fixture with a plurality of Red, Green and Blue LEDs contained in the light fixture, or it may be an array of LED's.

The example lighting device N5 includes a processor 322 comprising a dual central processor unit (CPU) or multi-CPU 324/325, a random access memory (RANI) 326 and read only memory (ROM) 328. The memories 326 and/or 328 include computer program code for responding to lighting control information messages 170 from the central management system 101.

The following example steps in the flow diagram 400 of FIG. 6A, are performed by the lighting node, represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 402: receiving by the lighting node, a command message from a central management system to measure a received link quality indication (LQI) of the command message received by the lighting node over aggregated network links between the lighting node and the central management system, and to return a status message including a measured value of the received link quality indication (LQI) to the central management system;

Step 404: receiving by the lighting node, a disconnect command from the central management system to disconnect from the network and to disconnect from the network in response to the disconnect command;

Step 406: entering by the lighting node, a discovery mode and periodically broadcast a discovery message in the network in response to disconnecting from the network;

Step 408: determining by the lighting node, whether an acknowledgement has been received from a gateway of the central management system or from a repeater in the network, in response to the broadcasting of the discovery message, enabling the lighting node to rejoin the network; and Step 410: wirelessly connecting by the lighting node, to the gateway of the central management system or to the repeater in the network and rejoining the network.

Figure 6B:
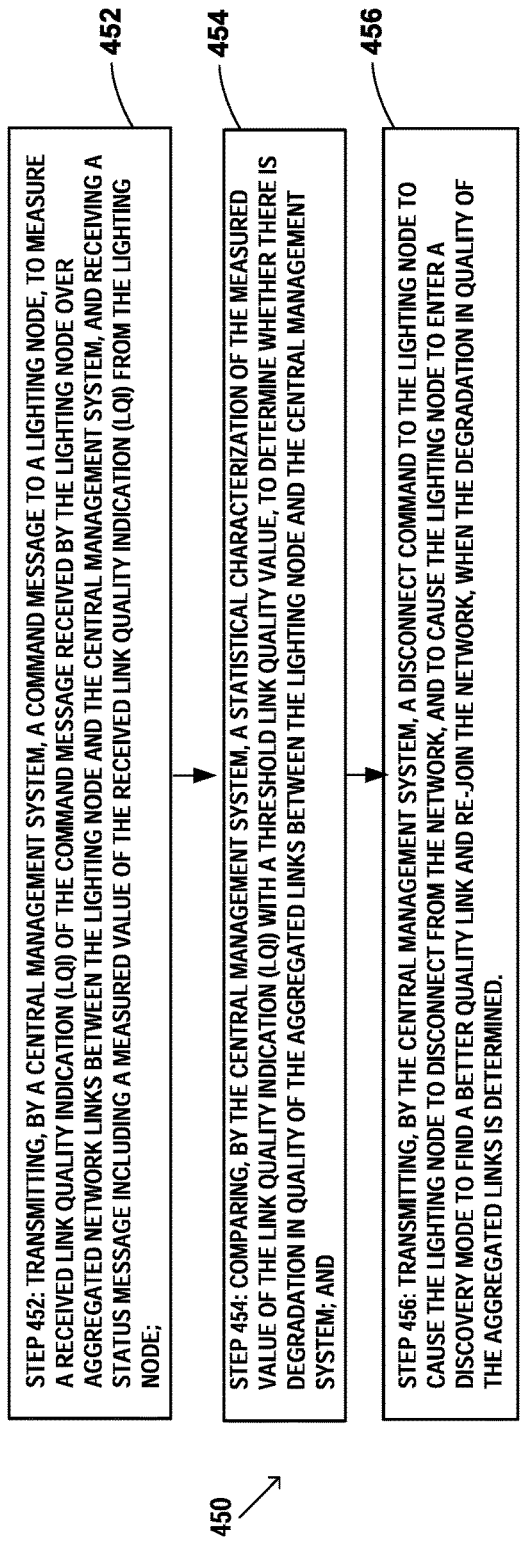
FIG. 6B is an example flow diagram of steps performed by the central management system (CMS).

The following example steps in the flow diagram 450 of FIG. 6B, are performed by the central management system (CMS) represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 452: transmitting, by a central management system, a command message to a lighting node, to measure a received link quality indication (LQI) of the command message received by the lighting node over aggregated network links between the lighting node and the central management system, and receiving a status message including a measured value of the received link quality indication (LQI) from the lighting node;

Step 454: comparing, by the central management system, a statistical characterization of the measured value of the link quality indication (LQI) with a threshold link quality value, to determine whether there is degradation in quality of the aggregated links between the lighting node and the central management system; and Step 456: transmitting, by the central management system, a disconnect command to the lighting node to cause the lighting node to disconnect from the network, and to cause the lighting node to enter a discovery mode to find a better quality link and rejoin the network, when the degradation in quality of the aggregated links is determined.

Figure 6C:
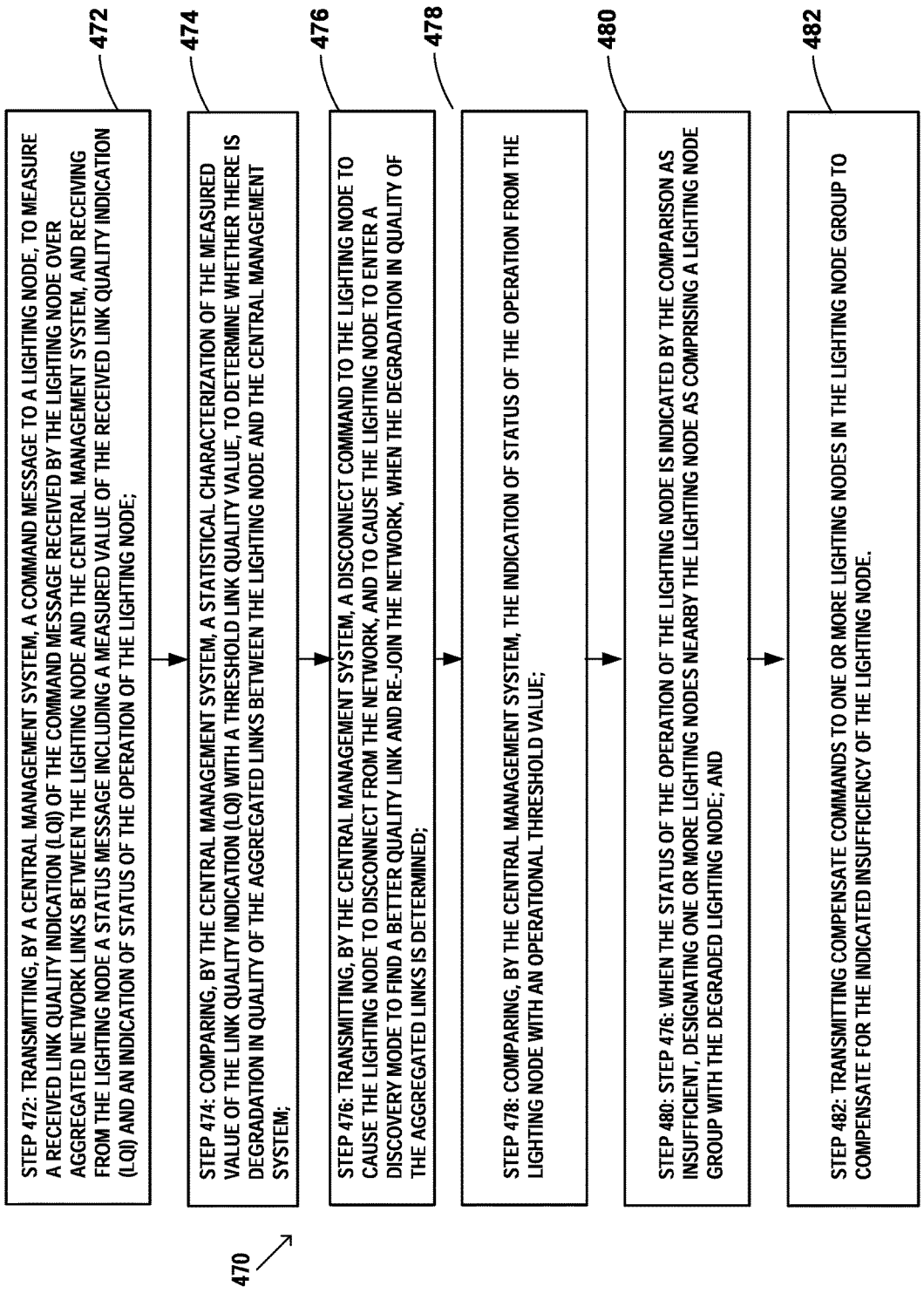
FIG. 6C is an example flow diagram of steps performed by the central management system (CMS), for monitoring the status of the operation of the lighting node.

The following example steps in the flow diagram 470 of FIG. 6C, are performed by the central management system (CMS) for monitoring the status of the operation of the lighting node, represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 472: transmitting, by a central management system, a command message to a lighting node, to measure a received link quality indication (LQI) of the command message received by the lighting node over aggregated network links between the lighting node and the central management system, and receiving from the lighting node a status message including a measured value of the received link quality indication (LQI) and an indication of status of the operation of the lighting node;

Step 474: comparing, by the central management system, a statistical characterization of the measured value of the link quality indication (LQI) with a threshold link quality value, to determine whether there is degradation in quality of the aggregated links between the lighting node and the central management system;

Step 476: transmitting, by the central management system, a disconnect command to the lighting node to cause the lighting node to disconnect from the network, and to cause the lighting node to enter a discovery mode to find a better quality link and rejoin the network, when the degradation in quality of the aggregated links is determined;

Step 478: comparing, by the central management system, the indication of status of the operation from the lighting node with an operational threshold value;

Step 480: Step 476: when the status of the operation of the lighting node is indicated by the comparison as insufficient, designating one or more lighting nodes nearby the lighting node as comprising a lighting node group with the degraded lighting node; and Step 482: transmitting compensate commands to one or more lighting nodes in the lighting node group to compensate for the indicated insufficiency of the lighting node.

Although specific example embodiments of the invention have been disclosed, persons of skill in the art will appreciate that changes may be made to the details described for the specific example embodiments, without departing from the spirit and the scope of the invention.

What is claimed is:

1. A central management system for organizing lighting nodes in a lighting network, comprising:
    a transceiver configured to transmit a command message to a lighting node, to measure a received link quality indication (LQI) of the command message received by the lighting node over aggregated wireless network links between the lighting node and the central management system, and configured to receive a status message including a measured value of the received link quality indication (LQI) from the lighting node;
    a processor, coupled to the transducer, configured to compare a statistical characterization of the measured value of the link quality indication (LQI) with a threshold link quality value, to determine whether there is degradation in quality of the aggregated links between the lighting node and the central management system;
    the processor further configured to cause a disconnect command to be sent to the lighting node to disconnect the lighting node from the wireless network, and cause the lighting node to enter a discovery mode to find a better quality link and rejoin the wireless network, when the degradation in quality of the aggregated links is determined;
    wherein the central management system is configured to compile a map of accumulated link quality data points received for a plurality of the lighting nodes in the network, to map out overall health of the network.

2. The central management system of claim 1, further comprising:
    the transceiver configured to receive a discovery message from the lighting node when the lighting node is within radio range, and the processor configured to validate information from the discovery message, to determine a best path for communication of messages between the lighting node and the central management system based on the information of the discovery message, and to commission the lighting node;
    the transceiver further configured to receive a request message from at least one commissioned lighting node, including information from a discovery message of the lighting node, when the lighting node is not within radio range, the request message requesting to invoke a repeater function in the at least one commissioned lighting node, for forwarding messages from the lighting node to the central management system; and
    the transceiver further configured to receive a repeated discovery message through the at least one commissioned lighting node acting as a repeater for the lighting node when the lighting node not is within radio range, and the processor further configured to determine a best path for communication of messages between the lighting node and the central management system through the at least one commissioned lighting node acting as a repeater for the lighting node.

3. The central management system of claim 1, further comprising:
    one or more gateways in the wireless network, coupled to the central management system, configured to exchange wireless messages with lighting nodes within wireless communications range in the wireless network.

4. The central management system of claim 1, wherein the received link quality indication is based on at least one of received signal strength indication (RSSI), energy detection (ED), propagation delay, service group ID of the lighting node, functional group ID of the lighting node, processor size of the lighting node, storage size of the lighting node, and relative priority of network traffic of a lighting group of which the lighting node is a member, is information used by central management system to determine a best path for maximizing reliability or speed of communication between lighting node and the central management system.

5. The central management system of claim 1, further comprising:
    the transceiver further configured to monitor operation of the lighting node with the status message, and to receive the status message including an indication of status of the operation of the lighting node from the lighting node;
    the processor further configured to compare the indication of status of the operation from the lighting node with an operational threshold value; and
    the processor further configured to cause a notice to be sent of the operational status of the lighting node.

6. The central management system of claim 5, wherein the indication of status of the operation of the lighting node and the measured value of the received link quality indication (LQI) from the lighting node are included as payload in the status message sent to the central management system.

7. The central management system of claim 5, further comprising:
when the status of the operation of the lighting node is indicated by the comparison as insufficient, the processor further configured to designate one or more lighting nodes nearby the insufficient lighting node as comprising a new lighting node group that includes the insufficient lighting node; and
the transceiver further configured to transmit compensate commands to at least one of the one or more lighting nodes in the new lighting group, to modify operation of the one or more lighting nodes to compensate for the insufficiency of the lighting node.

8. A lighting node in a lighting network, comprising:
a transceiver, in the lighting node, configured to receive a command message from a central management system to measure a received link quality indication (LQI) of the command message received by the lighting node over aggregated network links between the lighting node and the central management system, and to return a status message including a measured value of the received link quality indication (LQI) to the central management system;
the transceiver further configured to receive a disconnect command from the central management system to disconnect from the network and to disconnect from the network in response to the disconnect command;
the transceiver further configured to enter a discovery mode and periodically broadcast a discovery message in the network in response to disconnecting from the network;
a processor, in the lighting node, coupled to the transducer, configured to determine whether an acknowledgement has been received from a gateway of the central management system or from a repeater in the network, in response to the broadcasting of the discovery message, enabling the lighting node to rejoin the network; and
the transceiver further configured to wirelessly connect the lighting node to the gateway of the central management system or to the repeater in the network and rejoin the network.

9. The lighting node of claim 8, further comprising:
the processor, coupled to the transducer, configured to cause the transceiver to transmit a repeater request message in the network to any nearby commissioned node, in response to no acknowledgement having been received from the gateway, to cause the commissioned node to request becoming a repeater for the lighting node; and
the transceiver configured to transmit a discovery message to be repeated through the commissioned lighting node acting as a repeater for the lighting node, in response to receiving an acknowledgement to the repeater request message.

10. The lighting node of claim 8, wherein the received link quality indication is based on at least one of received signal strength indication (RSSI), energy detection (ED), propagation delay, service group ID of the lighting node, functional group ID of the lighting node, processor size of the lighting node, storage size of the lighting node, and relative priority of network traffic of a lighting group of which the lighting node is a member, is information used by central management system to determine a best path for maximizing reliability or speed of communication between lighting node and the central management system.

11. The lighting node of claim 8, further comprising:
the transceiver further configured to transmit in the status message, an indication of status of operation of the lighting node.

12. The lighting node of claim 11, further comprising:
the transceiver further configured to receive a compensate command indicating at least one of one or more lighting nodes in a lighting group of which the lighting node is a member, are to modify their operation to compensate for an insufficiency of the lighting node, as indicated by the indication of status of the operation of the lighting node.

13. A method for operating a central management system for organizing lighting nodes in a lighting network, comprising:
transmitting, by a central management system, a command message to a lighting node, to measure a received link quality indication (LQI) of the command message received by the lighting node over aggregated network links between the lighting node and the central management system, and receiving a status message including a measured value of the received link quality indication (LQI) from the lighting node;
comparing, by the central management system, a statistical characterization of the measured value of the link quality indication (LQI) with a threshold link quality value, to determine whether there is degradation in quality of the aggregated links between the lighting node and the central management system;
transmitting, by the central management system, a disconnect command to the lighting node to cause the lighting node to disconnect from the network, and to cause the lighting node to enter a discovery mode to find a better quality link and rejoin the network, when the degradation in quality of the aggregated links is determined;
receiving by the central management system, a discovery message from the lighting node when the lighting node is within radio range, validating information from the discovery message, determining a best path for communication of messages between the lighting node and the central management system based on the information of the discovery message, and commissioning the lighting node;
receiving by the central management system, a request message from at least one commissioned lighting node, including information from a discovery message of the lighting node, when the lighting node is not within radio range, the request message requesting to invoke a repeater function in the at least one commissioned lighting node, for forwarding messages from the lighting node to the central management system; and
receiving by the central management system, a repeated discovery message through the at least one commissioned lighting node acting as a repeater for the lighting node when the lighting node not is within radio range, and determining a best path for communication of messages between the lighting node and the central management system through the at least one commissioned lighting node acting as a repeater for the lighting node.

14. The method for operating a central management system claim 13, wherein the received link quality indication is based on at least one of received signal strength indication (RSSI), energy detection (ED), propagation delay, service group ID of the lighting node, functional group ID of the lighting node, processor size of the lighting node, storage size of the lighting node, and relative priority of network traffic of a lighting group of which the lighting node is a member, is information used by central management system to determine a best path for maximizing reliability or speed of communication between lighting node and the central management system.

15. The method for operating a central management system of claim 13, further comprising:
monitoring by the central management system, operation of the lighting node with the status message, and receiving the status message including an indication of status of the operation of the lighting node from the lighting node;
comparing by the central management system, the indication of status of the operation from the lighting node with an operational threshold value; and
transmitting by the central management system, a notice of the operational status of the lighting node;
wherein the indication of status of the operation of the lighting node and the measured value of the received link quality indication (LQI) from the lighting node are included as payload in the status message sent to the central management system.

16. The method for operating a central management system of claim 13, further comprising:
designating by the central management system, one or more lighting nodes nearby the lighting node as comprising a lighting node group with the lighting node, when the status of the operation from the lighting node is indicated by the comparison as insufficient; and
transmitting by the central management system, compensate commands to at least one of the one or more lighting nodes, to modify its operation to compensate for the insufficiency of the lighting node.

17. A method for operating a lighting node in a lighting network, comprising:
receiving by the lighting node, a command message from a central management system to measure a received link quality indication (LQI) of the command message received by the lighting node over aggregated network links between the lighting node and the central management system, and to return a status message including a measured value of the received link quality indication (LQI) to the central management system;
receiving by the lighting node, a disconnect command from the central management system to disconnect from the network and to disconnect from the network in response to the disconnect command;
entering by the lighting node, a discovery mode and periodically broadcast a discovery message in the network in response to disconnecting from the network;
determining by the lighting node, whether an acknowledgement has been received from a gateway of the central management system or from a repeater in the network, in response to the broadcasting of the discovery message, enabling the lighting node to rejoin the network; and
wirelessly connecting by the lighting node, to the gateway of the central management system or to the repeater in the network and rejoining the network.

18. The method for operating a lighting node claim 17, further comprising:
transmitting by the lighting node, an indication of status of operation of the lighting node, in the status message; and
receiving by the lighting node, a compensate command indicating at least one of one or more lighting nodes in a lighting group of which the lighting node is a member, are to modify their operation to compensate for an insufficiency of the lighting node, as indicated by the indication of status of the operation of the lighting node.

* * * * *